United States Patent
Yang et al.

(10) Patent No.: US 11,770,801 B2
(45) Date of Patent: Sep. 26, 2023

(54) SIDELINK COMMUNICATION RESOURCE SET CONFIGURATION AND MANAGEMENT

(71) Applicant: QUALCOMM Incorporated, San Diego, CA (US)

(72) Inventors: Wei Yang, San Diego, CA (US); Seyedkianoush Hosseini, San Diego, CA (US); Peter Gaal, San Diego, CA (US); Wanshi Chen, San Diego, CA (US); Hwan Joon Kwon, San Diego, CA (US); Krishna Kiran Mukkavilli, San Diego, CA (US); Tugcan Aktas, La Jolla, CA (US); Yi Huang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/379,877

(22) Filed: Jul. 19, 2021

(65) Prior Publication Data

US 2022/0039065 A1    Feb. 3, 2022

Related U.S. Application Data

(60) Provisional application No. 63/059,771, filed on Jul. 31, 2020.

(51) Int. Cl.
*H04W 72/02* (2009.01)
*H04W 56/00* (2009.01)
*H04W 72/0446* (2023.01)
*H04W 92/18* (2009.01)

(52) U.S. Cl.
CPC ......... *H04W 72/02* (2013.01); *H04W 56/001* (2013.01); *H04W 72/0446* (2013.01); *H04W 92/18* (2013.01)

(58) Field of Classification Search
CPC ............... H04W 72/02; H04W 56/001; H04W 72/0446; H04W 92/18
See application file for complete search history.

(56) References Cited

U.S. PATENT DOCUMENTS

| 2016/0183167 A1* | 6/2016 | Agiwal | H04W 48/16 370/329 |
| 2016/0302179 A1* | 10/2016 | Gupta | H04W 74/04 |
| 2021/0204284 A1* | 7/2021 | Lin | H04W 72/20 |

FOREIGN PATENT DOCUMENTS

EP          4124170 A1 *  1/2023

* cited by examiner

*Primary Examiner* — Chae S Lee
(74) *Attorney, Agent, or Firm* — Loza & Loza, LLP

(57) ABSTRACT

Aspects enable and provide techniques for sidelink communication resource configuration and management. A first user equipment (UE) negotiates with a second UE to select a first communication resource set (ComReSet) from a plurality of ComReSets for sidelink communication. Each of the plurality of ComReSets has a corresponding periodicity of one or more hyper-frames. The first UE communicates with the second UE using the first ComReSet using a frame timing synchronized with the corresponding periodicity of the first ComReSet.

20 Claims, 21 Drawing Sheets

1800

Negotiate with the second UE to select a first communication resource set (ComReSet) from a plurality of ComReSets for sidelink communication, each of the plurality of ComReSets having a corresponding periodicity of one or more hyper-frames — 1802

Communicate with the second UE using the first ComReSet using a frame timing synchronized with the corresponding periodicity of the first ComReSet — 1804

US 11,770,801 B2

SIDELINK COMMUNICATION RESOURCE SET CONFIGURATION AND MANAGEMENT

PRIORITY CLAIM

This application claims priority to and the benefit of provisional patent application No. 63/059,771 filed in the United States Patent Office on Jul. 31, 2020, the entire content of which is incorporated herein by reference as if fully set forth below in its entirety and for all applicable purposes.

TECHNICAL FIELD

The technology discussed below relates generally to wireless communication systems, and more particularly, to sidelink communication resources configuration and management.

INTRODUCTION

Wireless communication devices, sometimes referred to as user equipment (UE), may communicate with a base station or may communicate directly with another wireless device (e.g., UE). When a UE communicates directly with another UE, the communication can be referred to as peer-to-peer (P2P), device-to-device (D2D), or sidelink communication. In sidelink communication, voice and data traffic from one UE may be transmitted to one or more other UEs without the communication signals passing through a base station of a telecommunication network.

In particular use cases, a UE may be a wireless communication device, such as a portable cellular device, or may be a vehicle, such as an automobile, a drone, or may be any other connected devices. When the UE is a vehicle, such as an automobile, the D2D or sidelink communication may be referred to as vehicle-to-everything (V2X) communication. Some examples of V2X communication include vehicle-to-infrastructure (V2I), vehicle-to-network (V2N), vehicle-to-pedestrian (V2P), and vehicle-to-vehicle (V2V). V2X communication, particularly V2V communication, can be used in various applications, for example, collision avoidance and autonomous driving.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a first user equipment (UE) for wireless communication. The UE includes a transceiver configured to communicate with a second UE, a memory, and a processor operatively coupled to the memory and the transceiver. The processor and the memory are configured to negotiate with the second UE to select a first communication resource set (ComReSet) from a plurality of ComReSets for sidelink communication, each of the plurality of ComReSets having a corresponding periodicity of one or more hyper-frames. The processor and the memory are further configured to communicate with the second UE using the first ComReSet using a frame timing synchronized with the corresponding periodicity of the first ComReSet.

Another aspect of the disclosure provides a method of wireless communication at a first UE. The method includes negotiating with a second UE to select a first ComReSet from a plurality of ComReSets for sidelink communication, each of the plurality of ComReSets having a corresponding periodicity of one or more hyper-frames. The method further includes communicating with the second UE using the first ComReSet using a frame timing synchronized with the corresponding periodicity of the first ComReSet.

Another aspect of the disclosure provides a first UE for wireless communication. The first UE includes a transceiver configured to communicate with a second UE, a memory, and a processor operatively coupled to the memory and the transceiver. The processor and the memory are configured to negotiate with the second UE to select a first ComReSet from a plurality of ComReSets for sidelink communication, each of the plurality of ComReSets having a corresponding periodicity of one or more frames. The processor and the memory are further configured to transmit a message in a first time slot of the first ComReSet to reserve a second time slot of the first ComReSet in a same frame.

Another aspect of the disclosure provides a method of wireless communication at a first UE. The method includes negotiating with a second UE to select a first ComReSet from a plurality of ComReSets for sidelink communication, each of the plurality of ComReSets having a corresponding periodicity of one or more frames. The method further includes transmitting a message in a first time slot of the first ComReSet to reserve a second time slot of the first ComReSet in a same frame.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all implementations can include one or more of the advantageous features discussed herein. In other words, while one or more implementations may be discussed as having certain advantageous features, one or more of such features may also be used in accordance with the various implementations discussed herein. In similar fashion, while exemplary implementations may be discussed below as device, system, or method, it should be understood that such examples can be implemented in various devices, systems, and methods.

DETAILED DESCRIPTION

Figure 1:
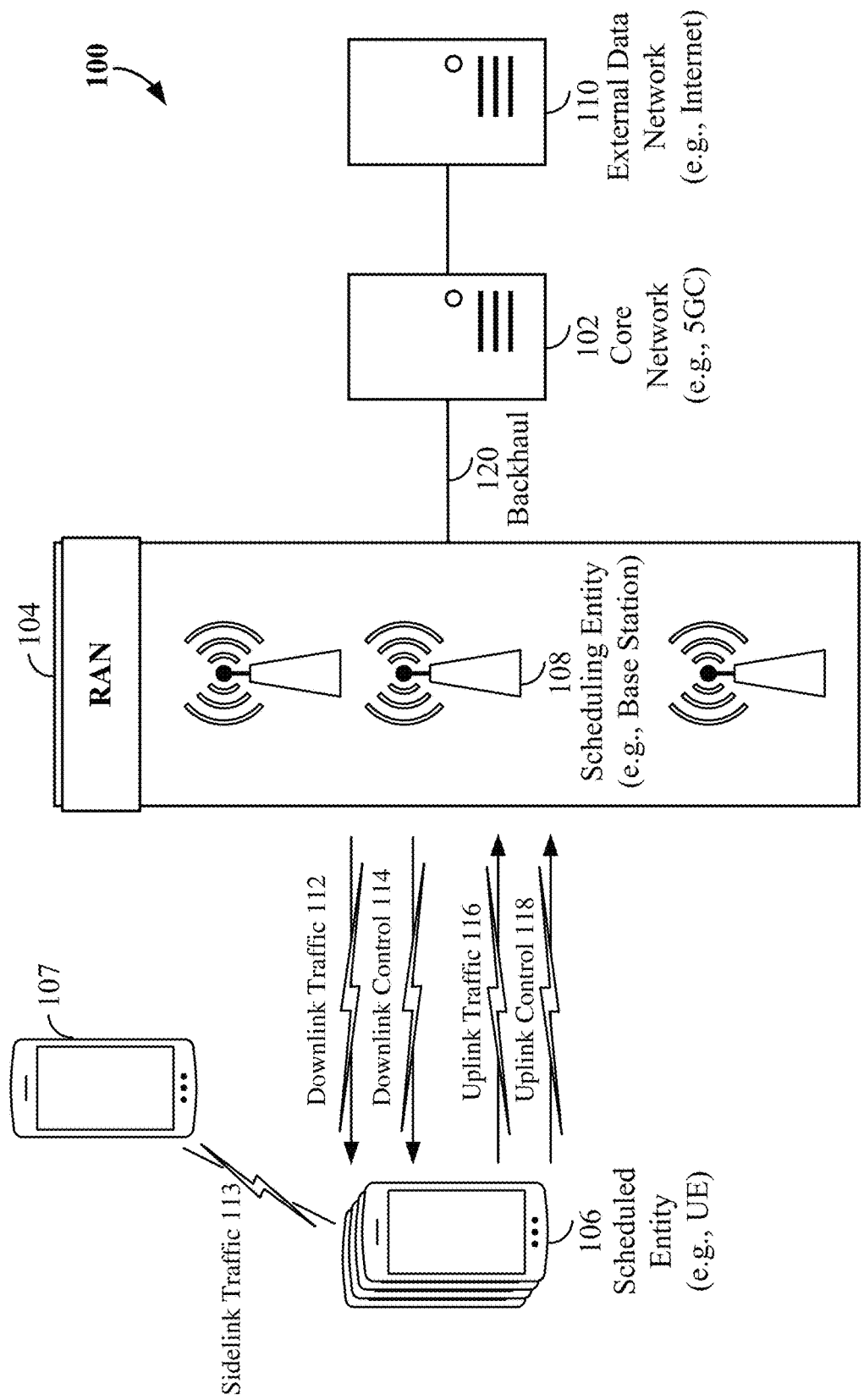
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure are directed to sidelink communication resources configuration and management. An example of sidelink communication is vehicle-to-everything (V2X) communication. In some aspects of the disclosure, V2X devices use a communication resource configuration and management procedure to determine periodic resources for frame-based sidelink communication with potential power saving. In some aspects, resource allocation for sidelink communication can be reservation-based. Communication resources can be partitioned into communication resource sets that are periodic in time. A communication resource set (ComReSet) can contain a set of subcarriers/subchannels and slot(s). In the time domain, each ComReSet may contain one or more slots, and the ComReSet may occur periodically in time.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106). In some aspects, transmissions from between UEs (e.g., UE 106 and UE 107) may be referred to as sidelink traffic or transmissions 113.

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
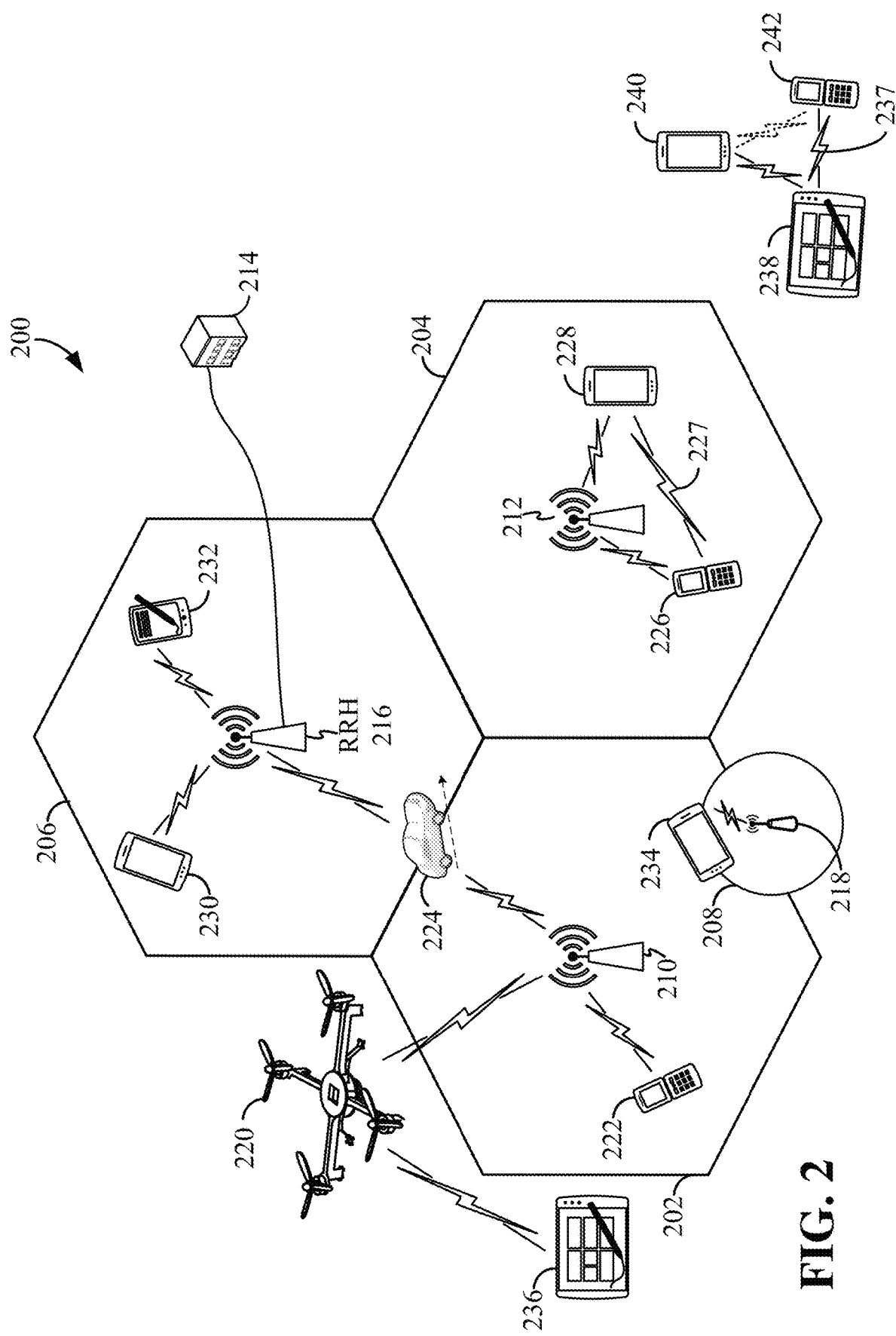
FIG. 2 is a conceptual illustration of an example of a radio access network according to some aspects of the disclosure.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell.

Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources (e.g., ComReSet) to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (TDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G New Radio (NR) specifications, user data may be coded in various manners. Some data can be coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel coding techniques. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-TDMA)). However, within the scope of the present disclosure, multiplexing and multiple access are not limited to the above schemes, and may be provided utilizing time division multiple access (TDMA), code division multiple access (CDMA), frequency division multiple access (TDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
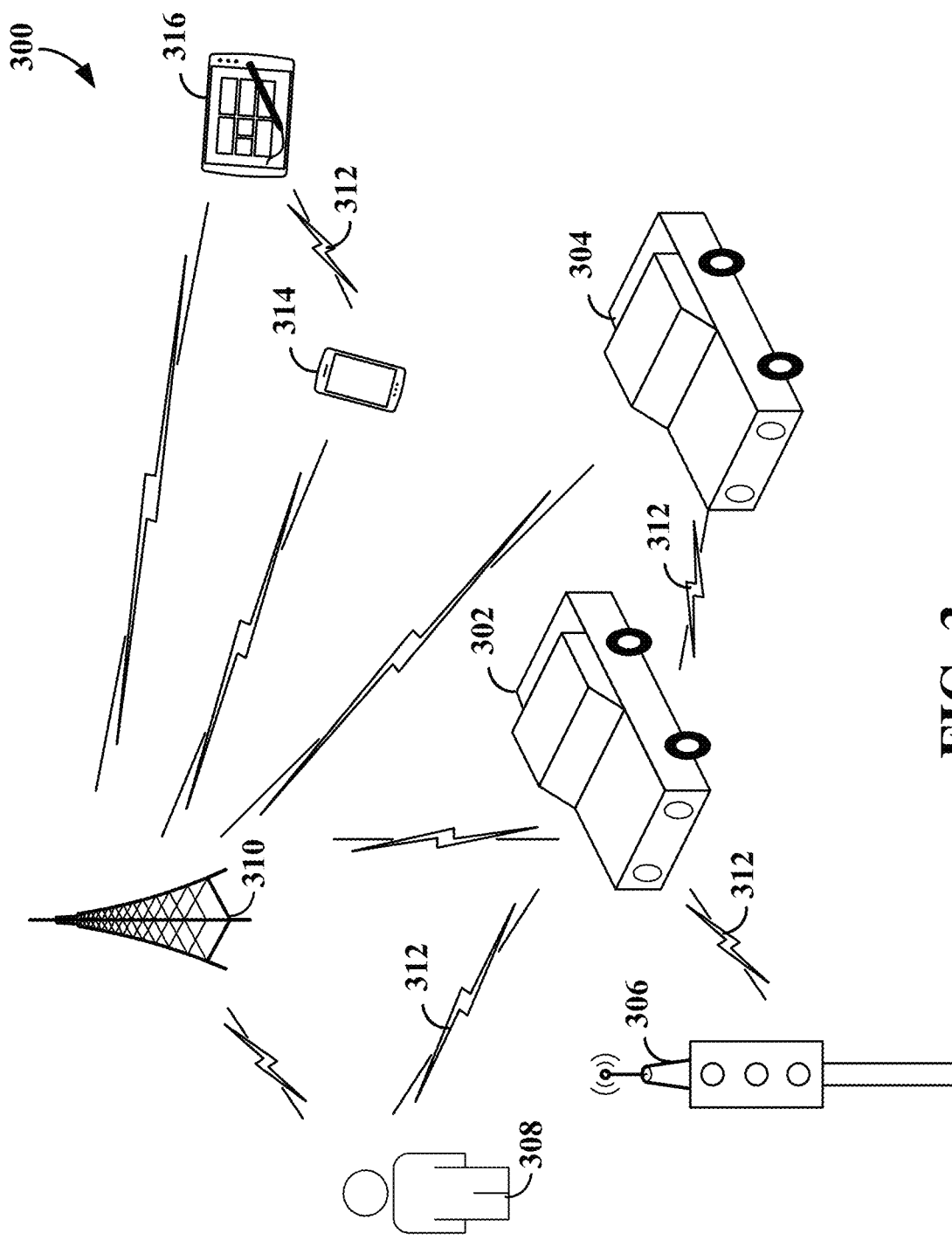
FIG. 3 is a conceptual illustration of an exemplary vehicle-to-everything (V2X) wireless communication network according to some aspects of the disclosure.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases. Examples of other proximity use cases may include public safety or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., V-UEs 302 and 304 and P-UE 308) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., UEs 314 and 316) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools (e.g., ComReSets). For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink 312 is the same between the two modes. Therefore, from a receiver's point of view, there is no difference between the modes.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-TDMA waveforms.

Figure 4:
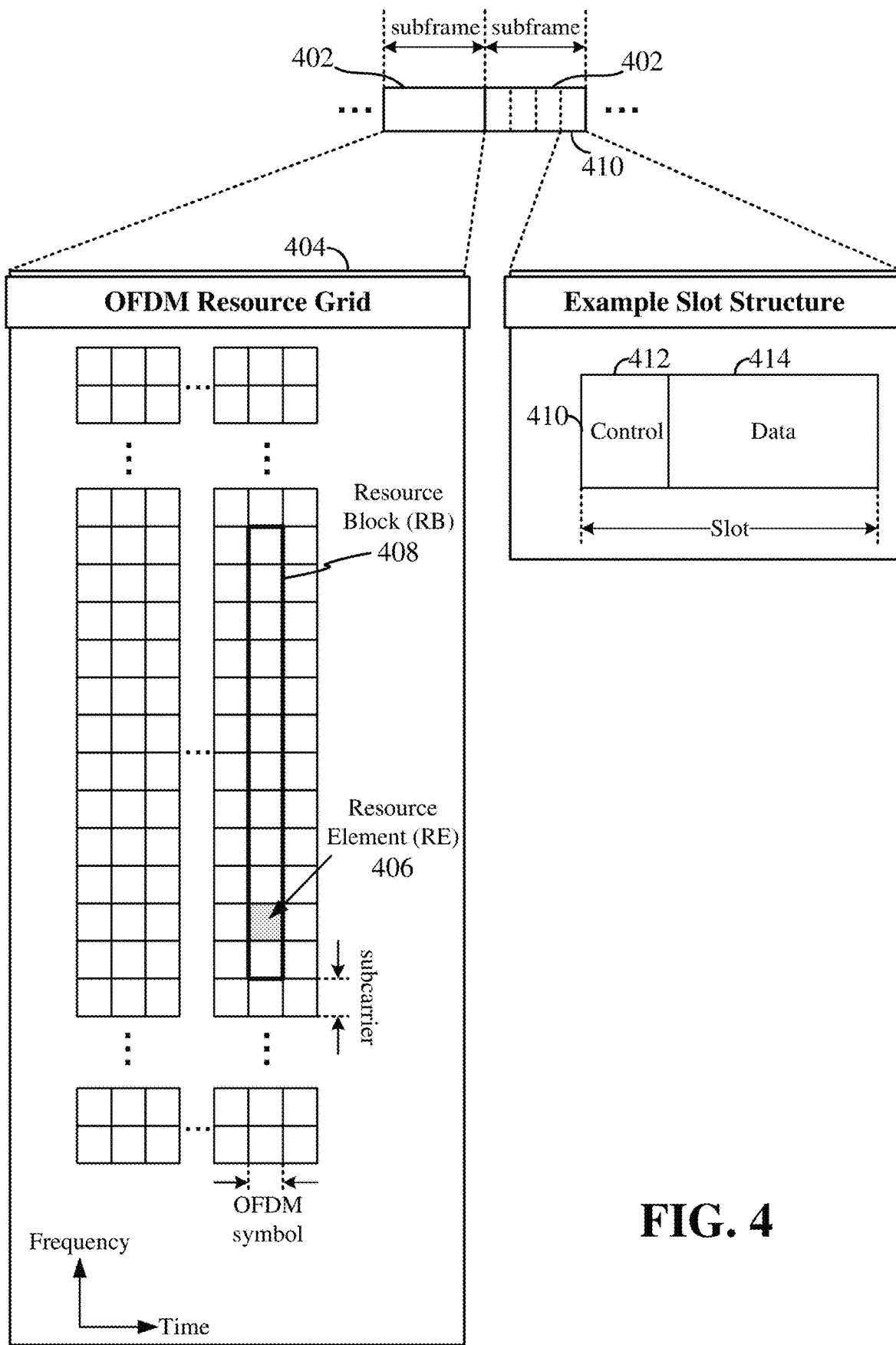
FIG. 4 is a schematic illustration of an organization of wireless resources in an air interface utilizing orthogonal frequency divisional multiplexing (OFDM) according to some aspects of the disclosure.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Frame-Based Communication Resource Set for Sidelink Communication

In some aspects of the disclosure, a sidelink communication resource pool includes resource elements (REs) similar to the RE 406 described above in relation to FIG. 4. The resources of the sidelink communication resource pool can be partitioned into multiple periodic communication resource sets (ComReSets) in the time domain. Each communication resource set (ComReSet) can contain a set of subcarriers/subchannels and slot(s). In the time domain, each ComReSet may contain one or more slots, and the ComReSet may occur periodically in time. In some aspects, the different ComReSets may be different in periodicity.

Figure 5:
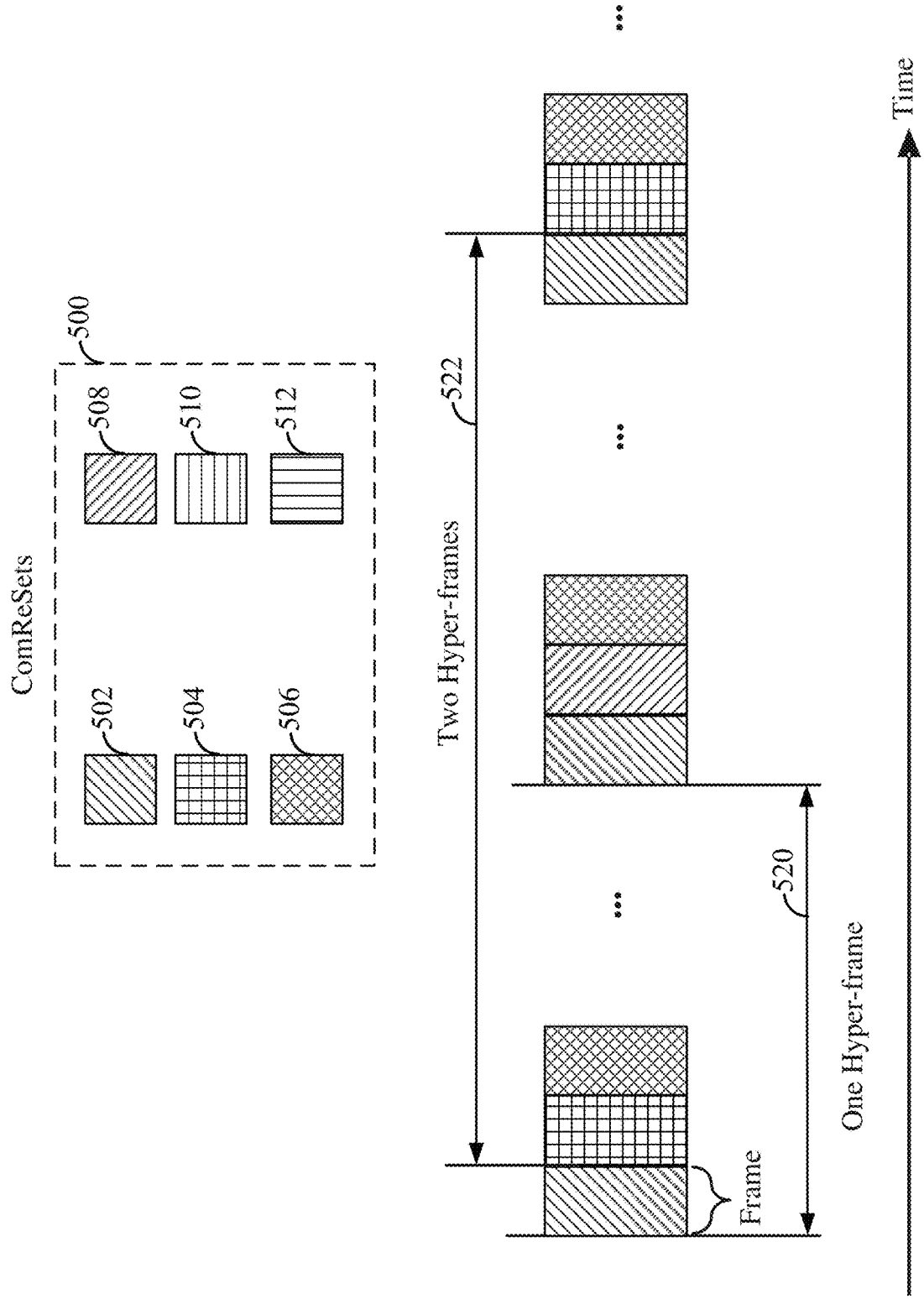
FIG. 5 is a schematic illustration of an exemplary sidelink communication resource set (ComReSet) definition according to some aspects of the disclosure.

FIG. 5 is a schematic illustration of an exemplary resource pool 500 for sidelink communication according to some aspects of the disclosure. In one example, the resource pool 500 may include contiguous and/or non-contiguous time and frequency resources. The resource pool 500 may be partitioned into a number of periodic ComReSets (six exemplary ComReSets 502, 504, 506, 508, 510, and 512 illustrated in FIG. 5) in the time domain. A UE can use the resources in one or more of the ComReSets for sidelink communication. In some aspects, different ComReSets can have the same or different time durations. In some aspects, each ComReSet may contain one or more time slots. In some aspects, different ComReSets can have different periodicity. That is, different ComReSets may repeat in the time domain in different periods. For example, a first ComReSet 502 can have a period 520 that is shorter than a period 522 of a second ComReSet 504. In some aspects, different ComReSets may contain different subchannels and/or numbers of subchannels.

In some examples, as shown in FIG. 5, the ComReSets (e.g., ComReSets 502, 504, 506, 508, 510, and 510) can have a frame-based timing structure. In this example, each ComReSet has a time duration of a single frame that can be defined in time (e.g., 10 ms) or slots (e.g., 32 slots). The smallest periodicity of a ComReSet is N frames (N is a positive integer, e.g., 1, 2, 3 . . . etc.). A hyper-frame includes N frames. A periodicity of a ComReSet may correspond to one or more hyper-frames. That is, a hyper-frame includes a plurality of frames, and each frame in a hyper-frame corresponds to a different one of the ComReSets in included in the hyper-frame. In some aspects, the value of N can be defined in the communication standard (e.g., 5G NR) that governs the sidelink communication. In one example, the first ComReSet 502 can have a periodicity of one hyper-frame, and the second ComReSet 504 has a periodicity of two hyper-frames. In other examples, a ComReSet can have a periodicity of a plurality of (e.g., three or more) hyper-frames. In some aspects, a network entity (e.g., gNB, scheduling entity, or base station) can configure the value of N using semi-persistent (e.g., RRC configuration) and/or dynamic scheduling (e.g., DCI or MAC CE signaling). In some aspects, the value of N can be preconfigured at the UE. In some aspects, communication between sidelink UEs is frame-synchronized. That means sidelink communication between UEs is restricted within one or more predetermined frames within each hyper-frame, and the UE transmit/receive timing is synchronized with the frame timing. In some aspects, a pair of UEs may use a frame (e.g., ComReSet 504) for sidelink communication every K hyper-frames. In this case, the periodicity of the ComReSet (frame) is K×N frames (K is a positive integer). In some aspects, the value of K may be restricted to some predetermined values (e.g., 1, 2, 4, 5, 8, 10, 10, 16, etc.) that can be preconfigured at the UEs or configured by a scheduling entity.

Figure 6:
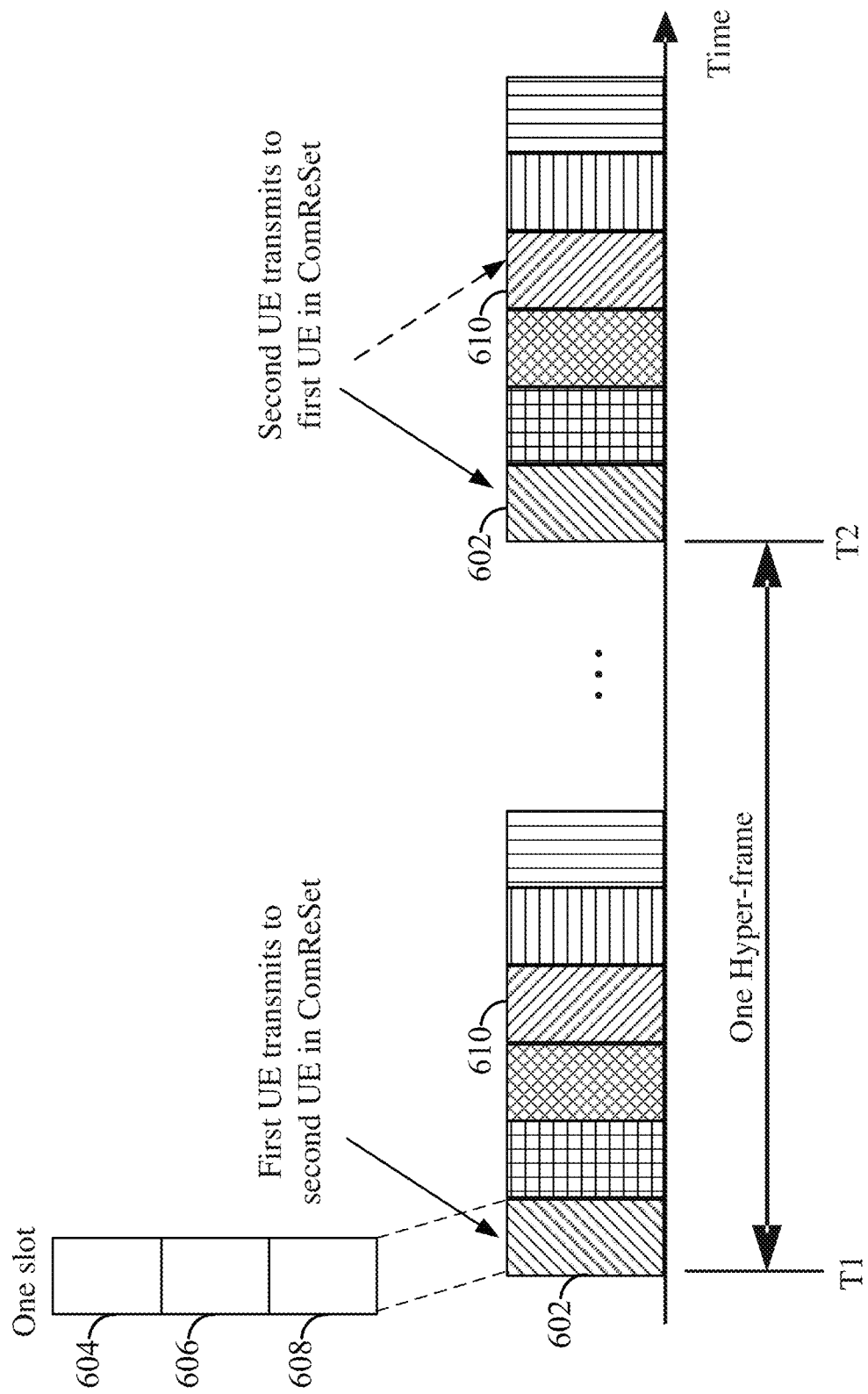
FIG. 6 is a schematic illustration of an exemplary single slot sidelink ComReSet according to some aspects of the disclosure.

FIG. 6 is a schematic illustration of an exemplary single-slot ComReSet definition according to some aspects of the disclosure. In this example, an exemplary ComReset (e.g., ComReSet 602) contains one time slot and a number of subchannels/subcarriers. Three exemplary subchannels 604, 606, and 608 are illustrated in FIG. 6 for a ComReSet 602. In one aspect, when a ComReSet contains one time slot, two UEs (e.g., V2X devices) can take turns using the same ComReSet to transmit signals to each other. For example, a first UE and a second UE can agree to use the ComReSet 602 to communicate with each other using sidelink communi-cation. The first UE can transmit sidelink data to the second UE 612 using the ComReSet 602 at time T1. After the first UE has finished sidelink transmission, at the next period (time T2), the second UE can transmit sidelink data to the first UE using the next ComReSet 602 in the next hyper-frame that occurs periodically. In this example, the ComReSet 602 has a periodicity of one hyper-frame.

In another example, two UEs can use different ComReSets to transmit sidelink data to each other. For example, a first UE and a second UE can agree to use a first ComReSet 602 and a second ComReSet 610 for sidelink communication. The first UE can use the first ComReSet 602 to transmit sidelink data to the second UE, and the second UE can use the second ComReSet 610 to transmit sidelink data to the first UE. In each of the examples above, a transmitting UE can randomly select a subchannel (e.g., subchannel 604, 606, or 608) to transmit sidelink data in a slot, and a receiving UE can scan all the subchannels of the ComReSet in the same slot to receive the sidelink communication. Each UE can reserve and use some or all subchannels in a ComReSet/slot.

Figure 7:
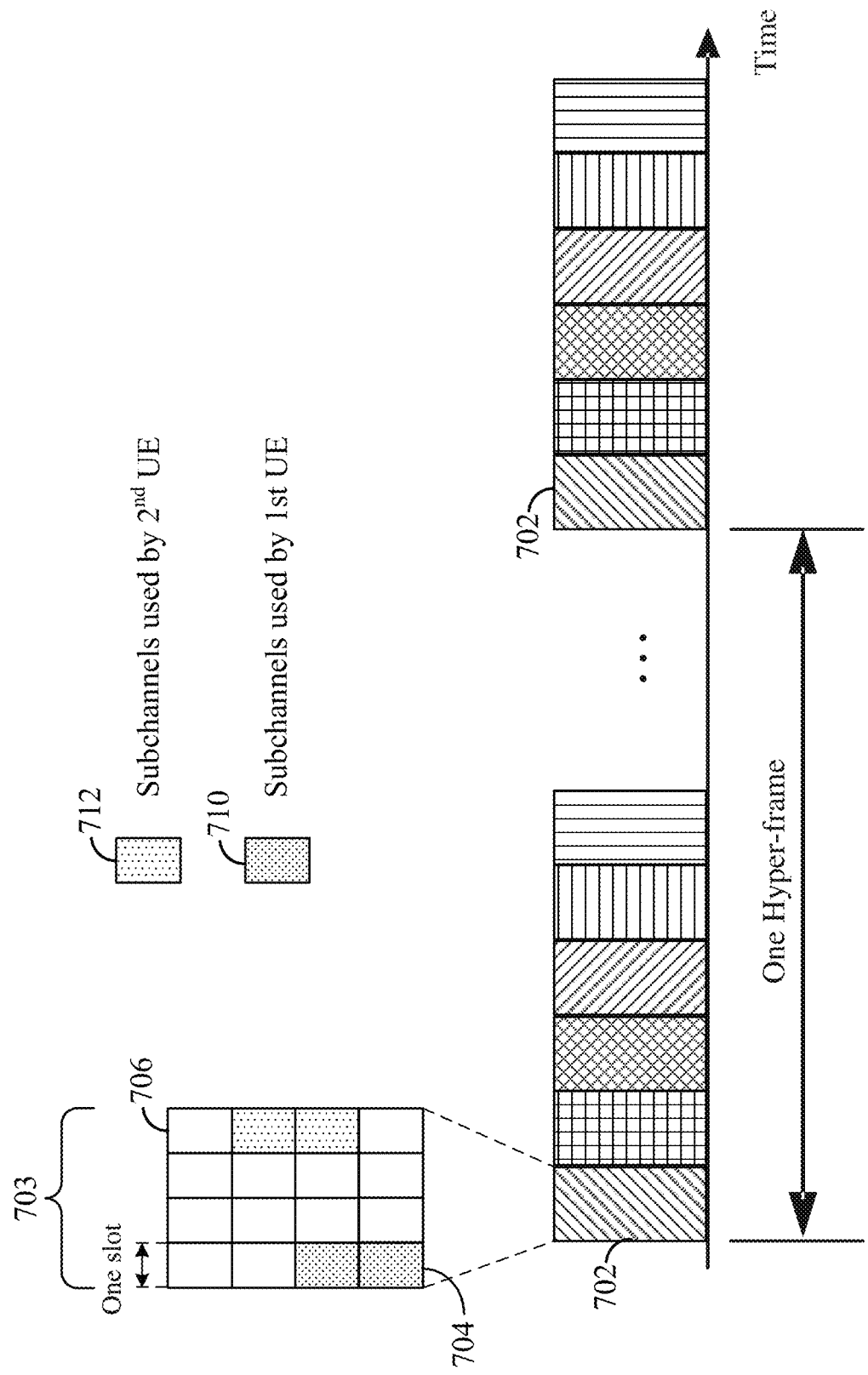
FIG. 7 is a schematic illustration of an exemplary multi-slot sidelink ComReSet according to some aspects of the disclosure.

FIG. 7 is a schematic illustration of an exemplary multi-slot ComReSet definition according to some aspects of the disclosure. In this example, a periodic ComReSet (e.g., ComReSet 702) can contain multiple time slots (e.g., four exemplary time slots 703 are shown in FIG. 7). For example, a first UE and a second UE can agree to use the multi-slot ComReSet 702 to communicate with each other using sidelink communication. In some aspects, the first UE and the second UE can be any of the UEs or scheduled entities described above in relation to FIGS. 1-3. The first UE can transmit sidelink data to the second UE using at least one slot (e.g., first slot 704) of the ComReSet 702, and the second UE can transmit sidelink data to the first UE using at least one slot (e.g., second slot 706) of the same ComReSet 702. In this case, the UEs can use different slots of the multi-slot ComReSet to transmit signal to each other. Each UE can reserve and use some or all of the subchannels in a slot. For example, the first UE can use first subchannels 710, and the second UE can use second subchannels 712 that may or may not overlap with the first subchannels.

Exemplary Frame-Synchronized Sidelink Communication Using ComReSets

Figure 8:
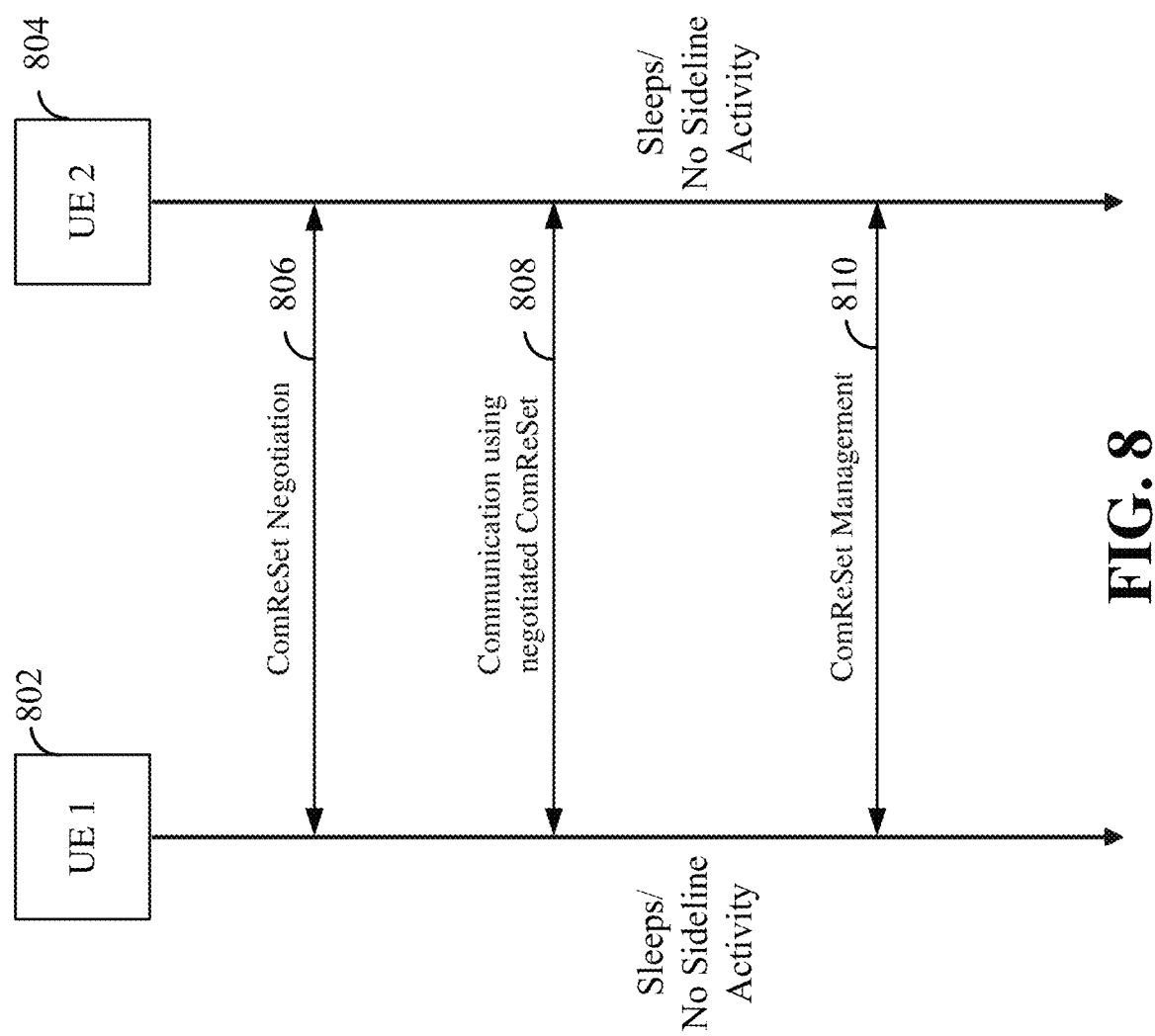
FIG. 8 is a call flow diagram illustrating exemplary sidelink communication according to some aspects of the disclosure.

FIG. 8 is a call flow diagram illustrating exemplary sidelink communication according to some aspects of the disclosure. A first UE 802 and a second UE 804 can negotiate with each other to determine one or more ComReSets for frame-synchronized sidelink communication. In one example, the UEs 802 and 804 may be any of the UEs or scheduled entities illustrated in FIGS. 1-3. Before the UEs can communicate with each other using a sidelink connection, the first UE 802 and the second UE 804 can negotiate (e.g., ComReSet negotiation 806) with each other to select the sidelink resources (e.g., one or more ComReSets) that can be used for sidelink communication. In one example, the sidelink resources may be similar to the sidelink resources described above in relation to FIGS. 5-7.

In some aspects, the first and/or second UEs can be configured by the network or preconfigured (e.g., according to a communication standard) with a set of periodicity values of ComReSets, for example, in units of frames or hyper-frames. In one example, the first UE can transmit the periodicity values to the second UE. In one example, the first UE can receive the periodicity values from the second UE. The periodicity values correspond to the periodicity of one or more ComReSets.

In one aspect, the UEs can perform ComReSet negotiation using a separate communication resource pool that is not part of the resource pool reserved for sidelink communication. For example, the UEs can use a discovery resource pool to determine one or more ComReSets for sidelink communication between the UEs. In one example, the discovery resource pool may include time-frequency resources (e.g., one or more RBs 408) dedicated by a network (e.g., base station or gNB) for negotiating sidelink resources. In another example, the discovery resource pool may include predetermined time-frequency resources (e.g., RB 408) specified or preconfigured in a communication standard (e.g., 5G NR) governing the sidelink communication.

In another aspect, the UEs can perform the ComReSet negotiation in a special, default, dedicated, or predetermined ComReSet among the available ComReSets of a sidelink resource pool. The special ComReSet may be designated or preconfigured for ComReSet negotiation purposes. For example, one of the ComReSets 500 shown in FIG. 5 may be a dedicated or default ComReSet (e.g., ComReSet 512) for negotiating sidelink resources between the UEs.

Once the UEs agree on the ComReSet(s), the UEs can communicate (e.g., communication using negotiated ComReSet 808) with each other using sidelink communication via one or more negotiated ComReSets. Because the negotiated ComReSets may occupy only a subset of time slots or frames within the sidelink resource pool, one or both UEs may sleep or enter an idle mode (i.e., do not transmit, receive, or sense the sidelink channel) during the time slots or frames that are not included in the selected ComReSets. In some aspects, the UEs (e.g., non-vehicular UEs) can enter a sleep mode to reduce power consumption while sleeping or not performing sidelink activities. In some aspects, the UEs can perform ComReSet management 810 to add and/or release ComReSets in order to adapt to changing sidelink traffic patterns and/or channel conditions.

In another aspect, the first UE 802/902 can select the ComReSet on its own and communicate the selected ComReSet to the second UE 804/904 using higher layer signaling, for example, using radio resource control (RRC) signaling and/or a medium access control (MAC) control element (CE) via the sidelink network.

Figure 9:
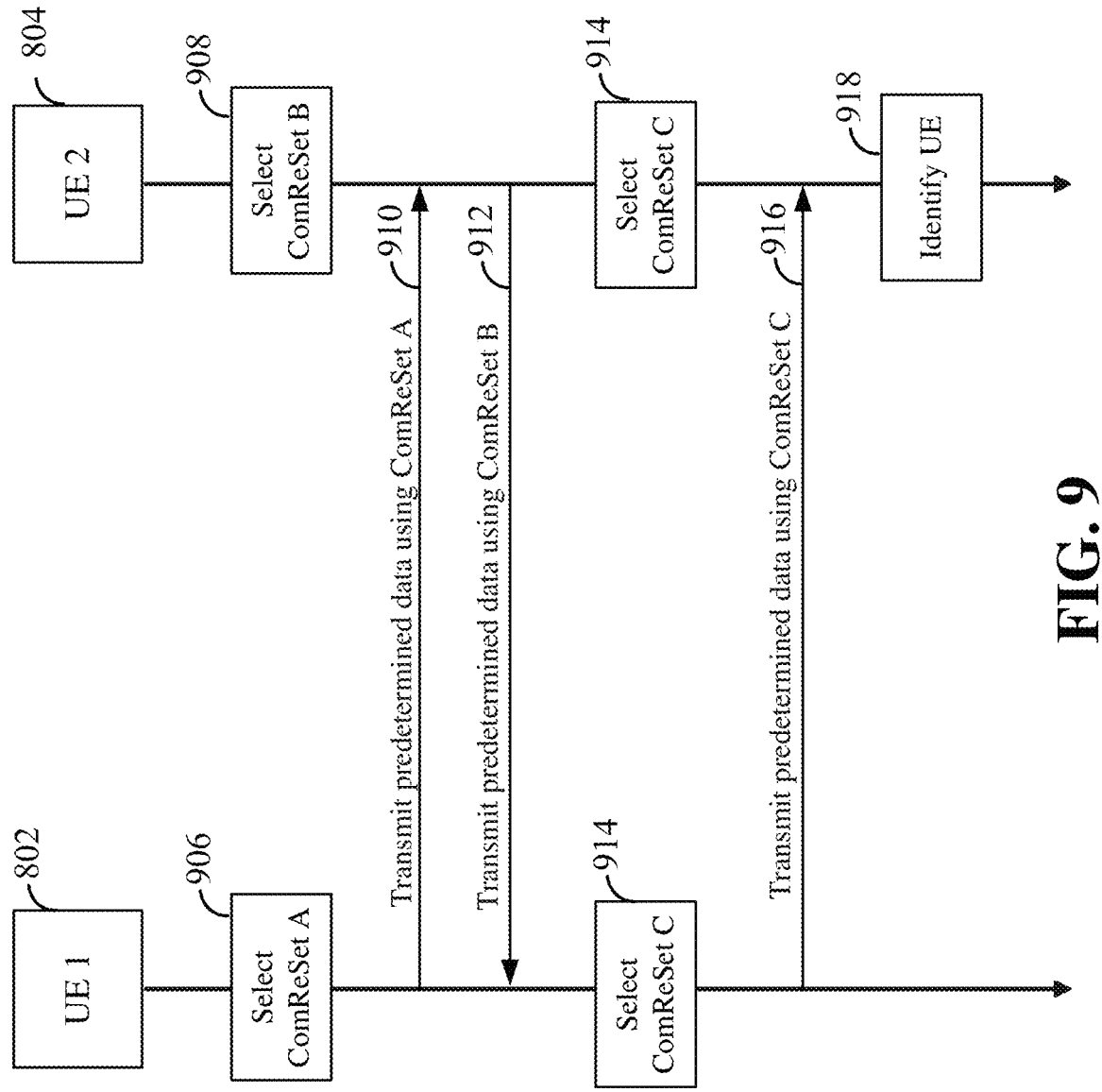
FIG. 9 is a call flow diagram illustrating an exemplary ComReSet selection process for sidelink communication according to some aspects of the disclosure.

FIG. 9 is a call flow diagram illustrating an exemplary ComReSet selection process for sidelink communication according to some aspects of the disclosure. Two UEs (e.g., UEs 802 and 804) can randomly scan the available ComReSets until the two UEs can agree on a common ComReSet for sidelink communication. For example, during the ComReSet negotiation 806 (see FIG. 8), the first UE 802 can randomly select a first ComReSet 906 (e.g., ComReSet A), and the second UE 804 can randomly select a second ComReSet 908 (e.g., ComReSet B). Then, the first UE 802 can transmit predetermined data 910 in the randomly selected ComReSet A, and the second UE 804 can transmit predetermined data 912 in the randomly selected ComReSet B. Each UE can also randomly select a ComReSet to monitor transmission from other UEs. When the transmitting UE (e.g., UE 802) and the receiving UE (e.g., UE 804) both select the same ComReSet 914 (e.g., ComReSet C), the receiving UE can identify 918 the transmitting UE based on the data 916 received from the transmitting UE. Then, the UEs can agree on using the commonly selected ComReSet (e.g., ComReSet C) for sidelink communication between the UEs.

Figure 10:
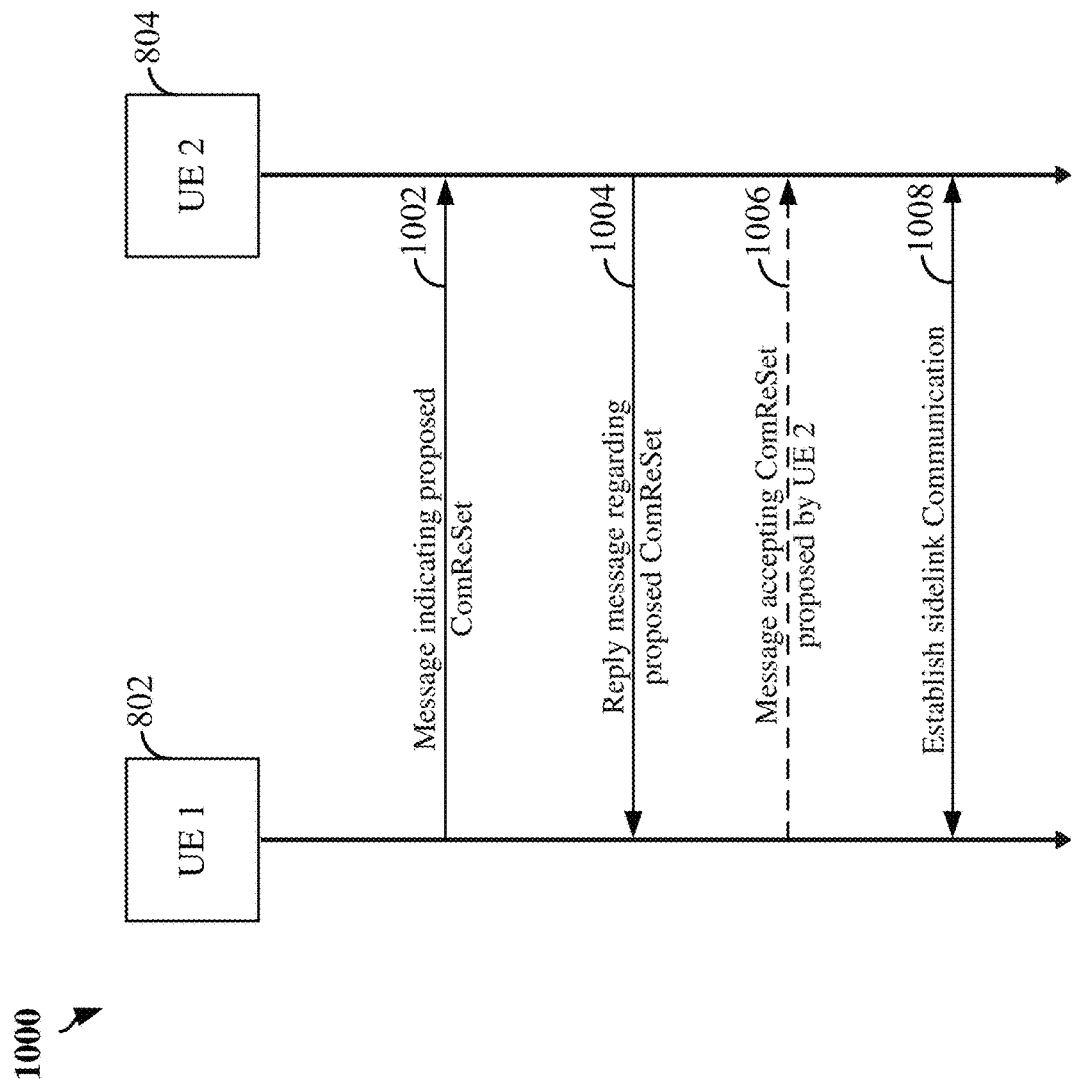
FIG. 10 is a diagram illustrating an exemplary sidelink ComReSet negotiation process according to some aspects of the disclosure.

FIG. 10 is a flow chart illustrating an exemplary ComReSet negotiation process 1000 according to one aspect of the disclosure. During the negotiation, the first UE 802 can transmit a sidelink message 1002 indicating one or more ComReSets that the UE desires or proposes to use for sidelink communication. For example, the ComReSet(s) may be selected from the resource pool 500 described above for frame-synchronized sidelink communication. If the second UE 804 receives the message 1002 from the first UE 802, the second UE 804 can transmit a reply message 1004 (e.g., acceptance or non-acceptance) regarding the ComReSet(s) proposed by the first UE 802. For example, the reply message 1004 can indicate whether or not the second UE 804 agrees to establish sidelink communication with the first UE 802 using the ComReSet(s) selected by the first UE 802. In some aspects, the second UE 804 can propose a different ComReSet in the reply message 1004. In that case, if the first UE 802 agrees to the different proposed ComReSet, the first UE 802 can transmit an acceptance message 1006 to the second UE 804. After the UEs agree on the ComReSet(s), the UEs can establish 1008 frame-synchronized sidelink communication using the agreed upon ComReSet(s).

Sidelink Control Information and Slot Formats

A sidelink device (e.g., UE) may schedule sidelink communication (e.g., PC5) by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the size of SCI-2 by indicating an amount of time-frequency resources that are allotted for SCI-2, a number of a PSSCH DMRS port(s), and a modulation and coding scheme (MCS) index. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource. In various aspects of the disclosure, the SCI-2 may further include the SL PT-RS configuration indicating a configurable number of PT-RS ports and a PTRS-DMRS port association.

Figure 11A:
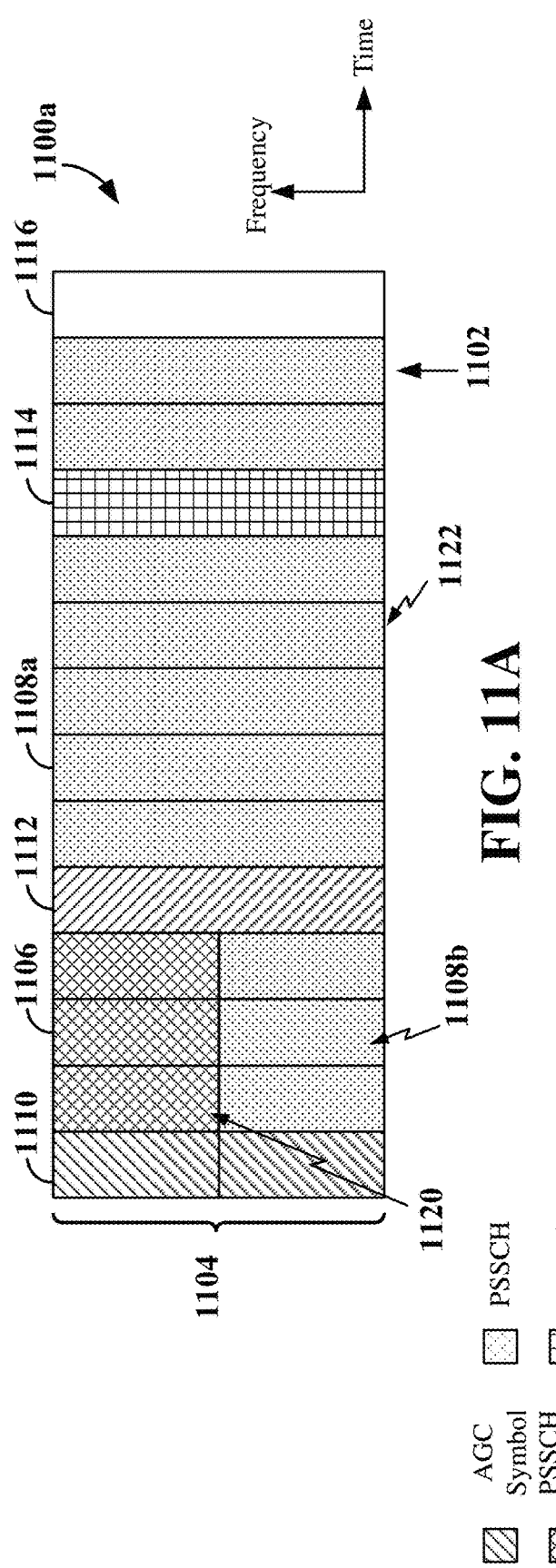
FIGS. 11A and 11B are diagrams illustrating examples of sidelink slot structures according to some aspects of the disclosure.
Figure 11B:
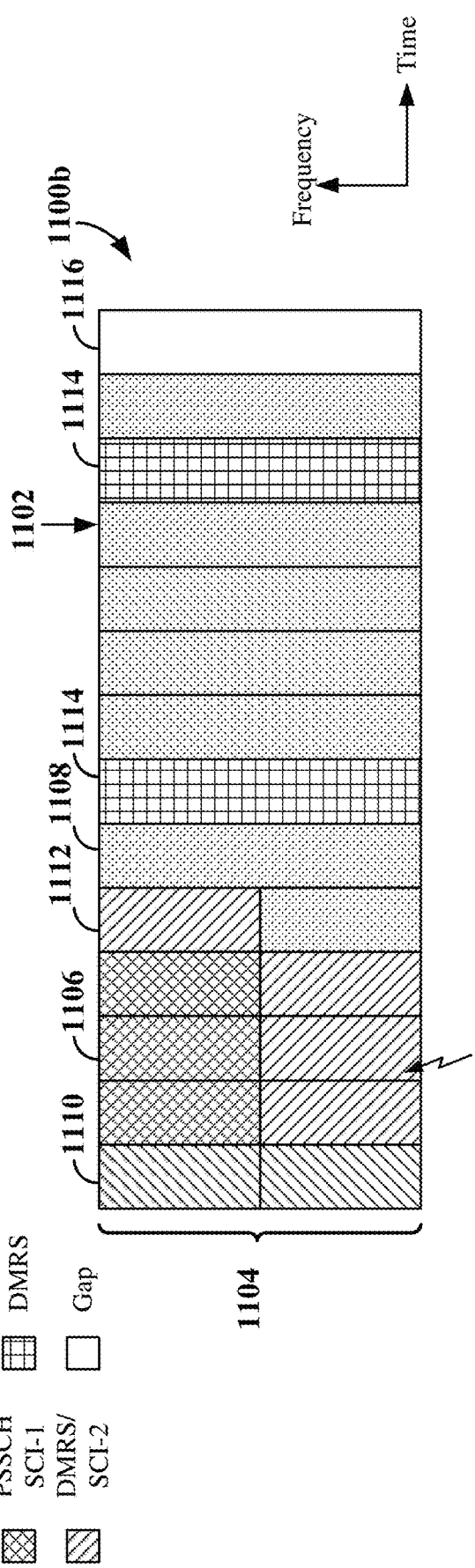

FIGS. 11A and 11B illustrate examples of sidelink slot structures according to some aspects. The sidelink slot structures may be utilized, for example, in a V2X or other D2D network implementing sidelink. In the examples shown in FIGS. 11A and 11B, time is in the horizontal direction with units of symbols 1102 (e.g., OFDM symbols); and frequency is in the vertical direction. Here, a carrier bandwidth 1104 allocated for sidelink communication is illustrated along the frequency axis. The carrier bandwidth 1104 may include a plurality sub-channels or subcarriers, where each sub-channel may include a configurable number of PRBs (e.g., 5, 15, 20, 25, 50, 75, or 50 PRBs).

Each of FIGS. 11A and 11B illustrate an example of a slot 1100a and 1100b including fourteen symbols 1102 that may be used for sidelink communication. However, it should be understood that sidelink communication can be configured to occupy fewer than fourteen symbols in a slot 1100a and 1100b, and the disclosure is not limited to any particular number of symbols 1102. Each sidelink slot 1100a and 1100b includes a physical sidelink control channel (PSCCH) 1106 occupying a control region 1120 of the slot 500a and 50b and a physical sidelink shared channel (PSSCH) 1108 occupying a data region 1122 of the slot 1100a and 1100b. The PSCCH 1106 and PSSCH 1108 are each transmitted on one or more symbols 1102 of the slot 1100a. The PSCCH 1106 includes, for example, SCI-1 that schedules transmission of data traffic on time-frequency resources of the corresponding PSSCH 1108. As shown in FIGS. 11A and 11B, the PSCCH 1106 and corresponding PSSCH 1108 can be transmitted in the same slot 1100a and 1100b.

In some examples, the PSCCH 1106 duration is configured to be two or three symbols. In addition, the PSCCH 1106 may be configured to span a configurable number of PRBs, limited to a single sub-channel. For example, the PSCCH 1106 may span 5, 12, 15, 20, or 25 PRBs of a single sub-channel. A DM-RS may further be present in every PSCCH symbol. In some examples, the DM-RS may be placed on every fourth RE of the PSCCH 1106. A frequency domain orthogonal cover code (FD-OCC) may further be applied to the PSCCH DM-RS to reduce the impact of colliding PSCCH transmissions on the sidelink channel. For example, a transmitting wireless communication device may randomly select the FD-OCC from a set of pre-defined FD-OCCs. In each of the examples shown in FIGS. 11A and 11B, the starting symbol for the PSCCH 1106 is the second symbol of the corresponding slot 1100a and 1100b and the PSCCH 1106 spans three symbols 1102.

The PSSCH 1108 may be time-division multiplexed (TDMed) with the PSCCH 1106 and/or frequency-division multiplexed (FDMed) with the PSCCH 1106. In the example shown in FIG. 11A, the PSSCH 1108 includes a first portion 1108a that is TDMed with the PSCCH 1106 and a second portion 1108b that is FDMed with the PSCCH 1106.

One and two layer transmissions of the PSSCH 1108 may be supported with various modulation orders (e.g., QPSK, 16-QAM, 64-QAM and 256-QAM). In addition, the PSSCH 1108 may include DM-RSs 1114 configured in a two, three, or four symbol DM-RS pattern. For example, slot 1100a shown in FIG. 11A illustrates a two symbol DM-RS pattern, while slot 1100b shown in FIG. 11B illustrates a three symbol DM-RS pattern. In some examples, the transmitting wireless communication device can select the DM-RS pattern and indicate the selected DM-RS pattern in SCI-1, according to channel conditions. The DM-RS pattern may be selected, for example, based on the number of PSSCH 1108 symbols in the slot 1100a and 1100b. In addition, a gap symbol 1116 is present after the PSSCH 1108 in each slot 1100a and 1100b.

Each slot 1100a and 1100b further includes SCI-2 1112 mapped to contiguous RBs in the PSSCH 1108 starting from the first symbol containing a PSSCH DM-RS. In the example shown in FIG. 11A, the first symbol containing a PSSCH DM-RS is the fifth symbol occurring immediately after the last symbol carrying the PSCCH 1106. Therefore, the SCI-2 512 is mapped to RBs within the fifth symbol. In the example shown in FIG. 11B, the first symbol containing a PSSCH DM-RS is the second symbol, which also includes the PSCCH 1106. In addition, the SCI-2/PSSCH DM-RS 1112 are shown spanning symbols two through five. As a result, the SCI-2/PSSCH DM-RS 1112 may be FDMed with the PSCCH 1106 in symbols two through four and TDMed with the PSCCH 1106 in symbol five.

In each of FIGS. 11A and 11B, the second symbol of each slot 1100a and 1100b is copied onto (repeated on) a first symbol 1110 thereof for automatic gain control (AGC) settling. For example, in FIG. 11A, the second symbol containing the PSCCH 1106 FDMed with the PSSCH 1108b may be transmitted on both the first symbol and the second symbol. In the example shown in FIG. 11B, the second symbol containing the PSCCH 1106 FDMed with the SCI-2/PSSCH DMRS 1112 may be transmitted on both the first symbol and the second symbol.

Communication Resource Set Reservation

In some aspects, sidelink resource allocation can be reservation-based. A UE can reserve sidelink resource allocation in units of subcarriers/subchannels in the frequency domain and slots in the time domain. In some aspects, a sidelink resource reservation may be limited to one or more slots of a ComReSet. A UE can reserve sidelink resources in a periodic ComReSet for use by the UE for sidelink communication. In some aspects, for a sidelink transmission, the UE can reserve resources in a current slot and up to two future slots. The UE can use aperiodic and/or periodic resource reservations. Using aperiodic resource reservation, the UE can reserve sidelink resources in a certain occurrence of a ComReSet that repeats with a certain periodicity (e.g., one or more hyper-frames). Using periodic resource reservation, the UE can reserve sidelink resources in a number of predetermined occurrences of a periodic ComReSet.

Figure 12:
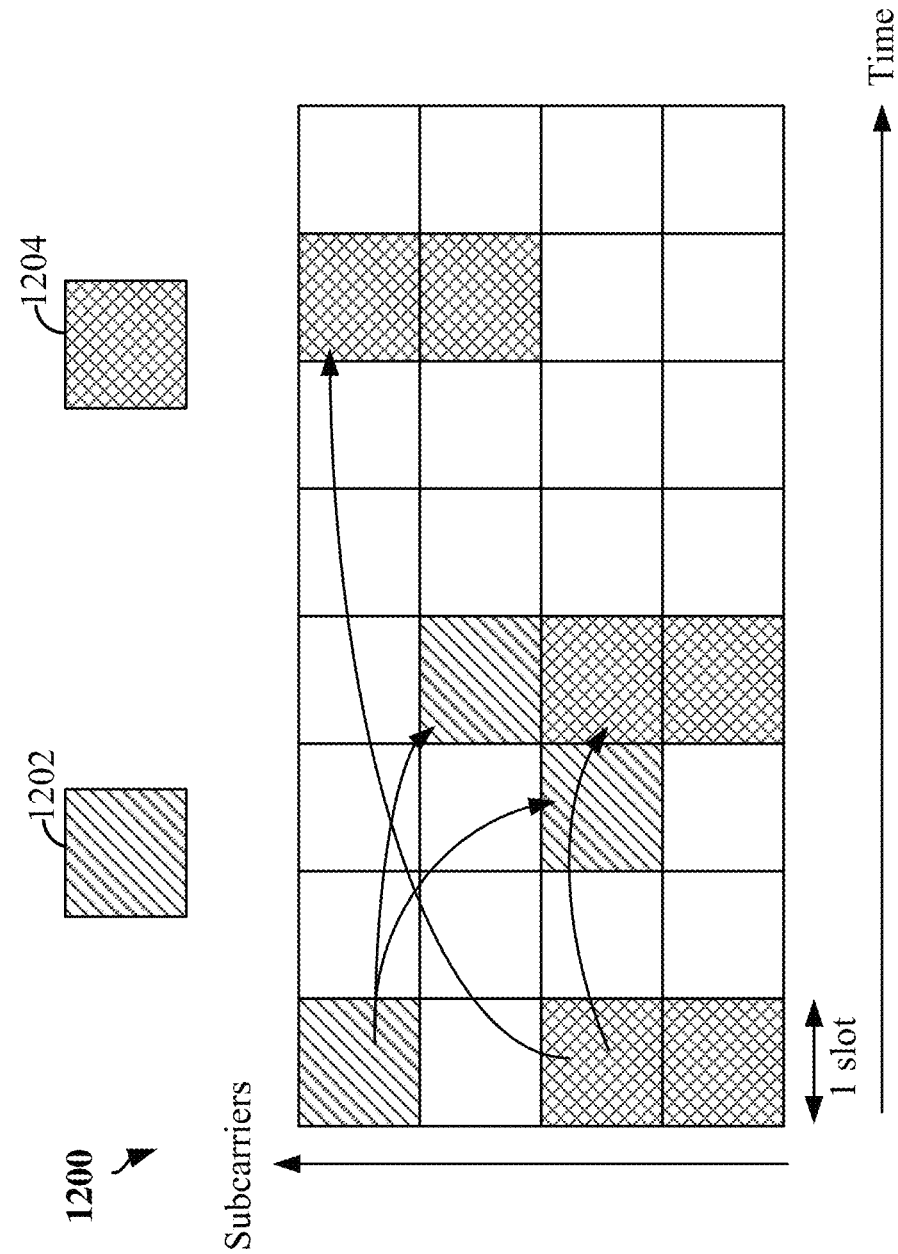
FIG. 12 is a schematic illustration of aperiodic sidelink resource reservation according to some aspects of the disclosure.

FIG. 12 illustrates an example of aperiodic sidelink resource reservation using a sidelink resource pool 1200. The UE can transmit sidelink control information (SCI) including sidelink reservation information in a physical sidelink control channel (PSCCH). For example, a first UE may reserve resources 1202 in a first slot and two future slots, and a second UE may reserve resources 1204 in the first slot and two future slots. The first UE and/or the second UE can reserve different subcarrier(s) in different slots.

Figure 13:
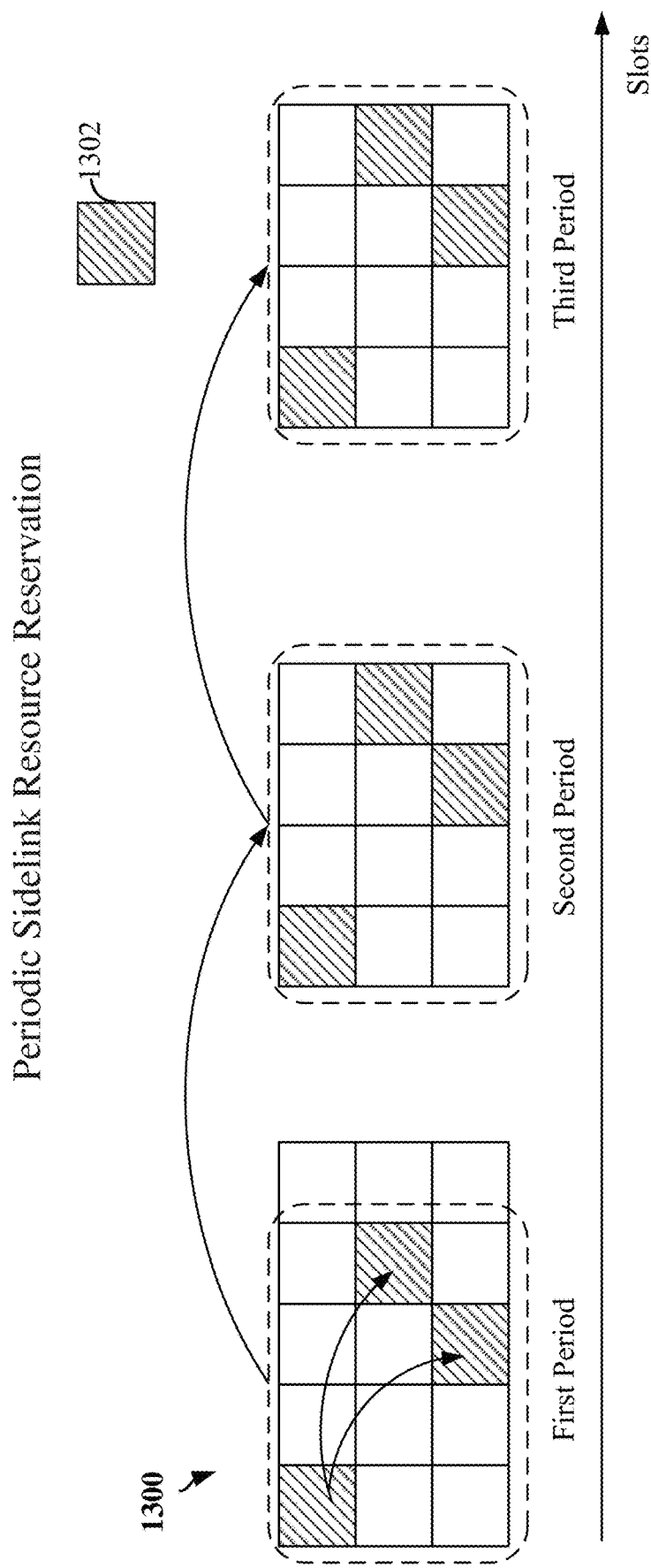
FIG. 13 is a schematic illustration of periodic sidelink resource reservation according to some aspects of the disclosure.

FIG. 13 illustrates an example of periodic resource reservation using a sidelink resource pool 1300. In this example, a UE may reserve resources 1302 in a first slot and two future slots in the sidelink resources 1300. The UE can indicate the resource reservation and its periodicity in SCI. In this case, the reserved resources can repeat for a predetermined number of periods (e.g., three periods shown in FIG. 13). In some aspects, the UE can signal a period between 0 milliseconds (ms) and 1000 ms using SCI.

Figure 14:
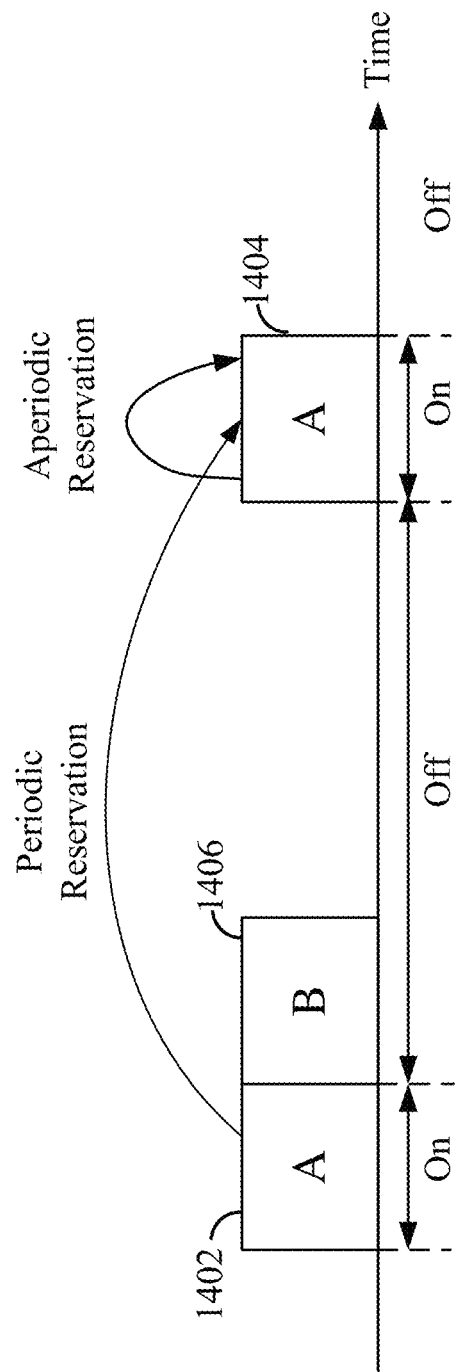
FIG. 14 is a schematic illustration of frame-based sidelink resource reservation according to some aspects of the disclosure.

In some aspects, distributed sidelink resource reservation can be restricted within a same ComReSet. That is, the UE refrains or avoids reserving sidelink resources from one ComReSet to a different ComReSet. Referring to FIG. 14, a UE has selected a certain ComReSet 1402 (e.g., Frame A), for example, using the ComReSet negotiation processes described above in relation to FIGS. 8-10. In one aspect, the UE can reserve periodic sidelink resources from frame A to frame A+K×N (K=1, 2, 3 . . . ; N is periodicity in frames) of the same ComReSet. For example, the UE can reserve resources from a first frame 1402 to a second frame 1404 of the same ComReSet shown in FIG. 14. In one aspect, the UE can reserve aperiodic sidelink resources within the same ComReSet (e.g., from one slot of a frame 1404 to another slot of the same frame).

Restricting sidelink resource reservation in the same ComReSet can facilitate the use of sleep mode to reduce power consumption of the UE. The UE can enter a sleep mode during the time (e.g., a slot) corresponding to a ComReSet that contains no sidelink sources reserved for the UE. Therefore, the UE may be in an ON or awake state during a reserved frame A and in an OFF or sleep state in non-reserved frames (e.g., frame B) to reduce power consumption. For example, in the hyper-frame 520 shown in FIG. 5, if the UE is restricted to reserve only sidelink resources in ComReSet 502, the UE can be in a sleep mode (e.g., low power mode) during the time of other ComReSets in the same hyper-frame. All UEs in the network are frame-synchronized (by frame or hyper-frame) in timing. Two UEs are either assigned to use the same ComReSet/frame, or they are assigned to different non-overlapping ComReSets/frames. In this case, the ComReSets or frames reserved by different UEs will not be partially overlapped (i.e., not overlapped). In one example, if a UE during a first ComReSet 1402 (e.g., frame A) could reserve resources in a second ComReSet 1406 (e.g., frame B), any UE that did not stay awake during the first ComReSet 1402 would not be able to receive the reservation message sent in the first ComReSet 1402. In that case, a potential contention could occur in sidelink resource usage by UEs that have selected different ComReSets for sidelink communication.

Sidelink Communication Sensing

Figure 15:
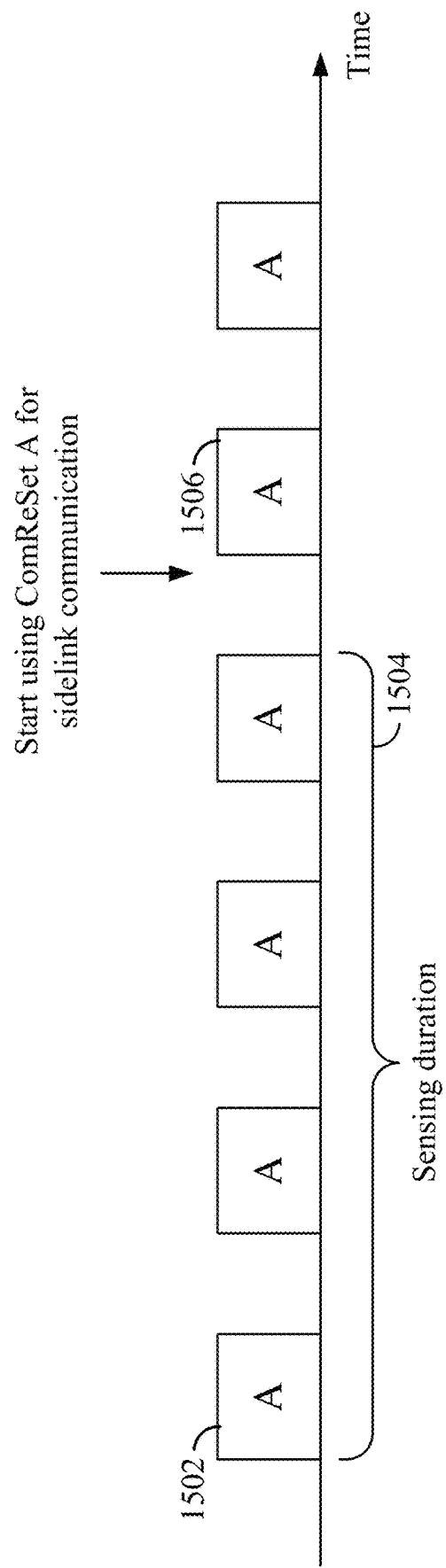
FIG. 15 is a schematic drawing illustrating a sensing process of sidelink resources in sidelink communication according to some aspects of the disclosure.

FIG. 15 is a schematic drawing illustrating a sensing process of sidelink resources in sidelink communication. In one aspect, a UE has selected ComReSet 1502 for sidelink communication, for example, using one of the ComReSet selection processes described above in relation to FIGS. 8-10. Before using the selected ComReSet 1502 for sidelink communication, the UE senses the spectrum of the ComReSet 1502 for a predetermined time duration 1504. To sense the ComReSet spectrum, the UE can listen, detect, or sense the subchannels or subcarriers at the time slots corresponding to the selected ComReSet. After sensing, the UE can determine the resources of the ComReSet that are occupied by other UEs and the resources that are available (i.e., not occupied by other UEs) for sidelink communication. For example, if the UE can detect or receive a signal or energy in the ComReSet spectrum with signal strength (e.g., RSSI) greater than a predetermined threshold, the UE may determine that one or more subcarriers or subchannels of the ComReSet are not available or being used by another device or UE. Then, the UE can make its resource allocation and reservation decision based on the sensing information for sidelink communication. For example, the UE can reserve one or more subcarriers of the ComReSet that are available based on the sensing result.

In one example, a pair of sidelink UEs (e.g., UE 802 and UE 804) first sense the ComReSets (based on their own selections) before sidelink transmission. Then, each UE can determine whether the selected ComReSets can be used for sidelink communication based on the sensing information, and transmit information on the selected ComReSets to the other UE during ComReSet negotiation (e.g., ComReSet negotiation 806). In another example, a pair of sidelink UEs can first negotiate using resources reserved or dedicated for ComReSet negotiation to determine the selected ComReSets, and then the UEs can sense before using the ComReSets for sidelink communication.

In some aspects, the scheduling entity (e.g., a base station) can configure the sensing duration, for example, by semi-persistent (e.g., RRC) scheduling. In some aspects, the sensing duration can be preconfigured at the UE. In some aspects, the UE can determine the sensing duration to be the largest configured period for periodic resource reservation such that the UE can sense all the messages that may contain a reservation of the current ComReSet 1502 when the UE starts using the ComReSet 1506 for sidelink communication. In one example, the largest configured period for periodic resource reservation may be 1000 ms or 32 slots.

Figure 16:
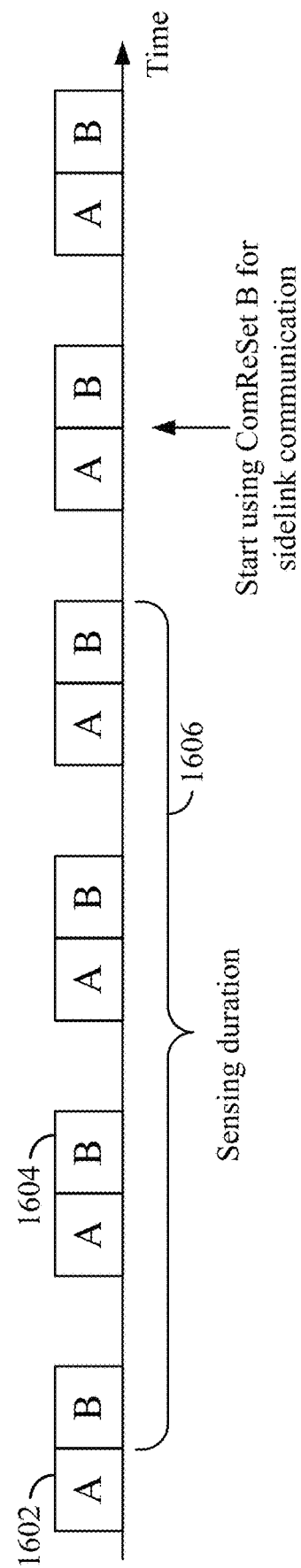
FIG. 16 is a schematic drawing illustrating the use of a sensing process to add a ComReSet according to some aspects of the disclosure.

In some aspects, a UE can perform sensing to add a ComReSet for sidelink communication. FIG. 16 is a schematic drawing illustrating a sensing process to add a ComReSet according to some aspects of the disclosure. The UE may have already reserved a first ComReSet 1602 (frame A) in an earlier sensing process similar to that described above in relation to FIG. 15. To add a second ComReSet 1604 (frame B), the UE can perform sensing for a predetermined time duration 1606 before adding the second ComReSet 1604 for sidelink communication.

Figure 17:
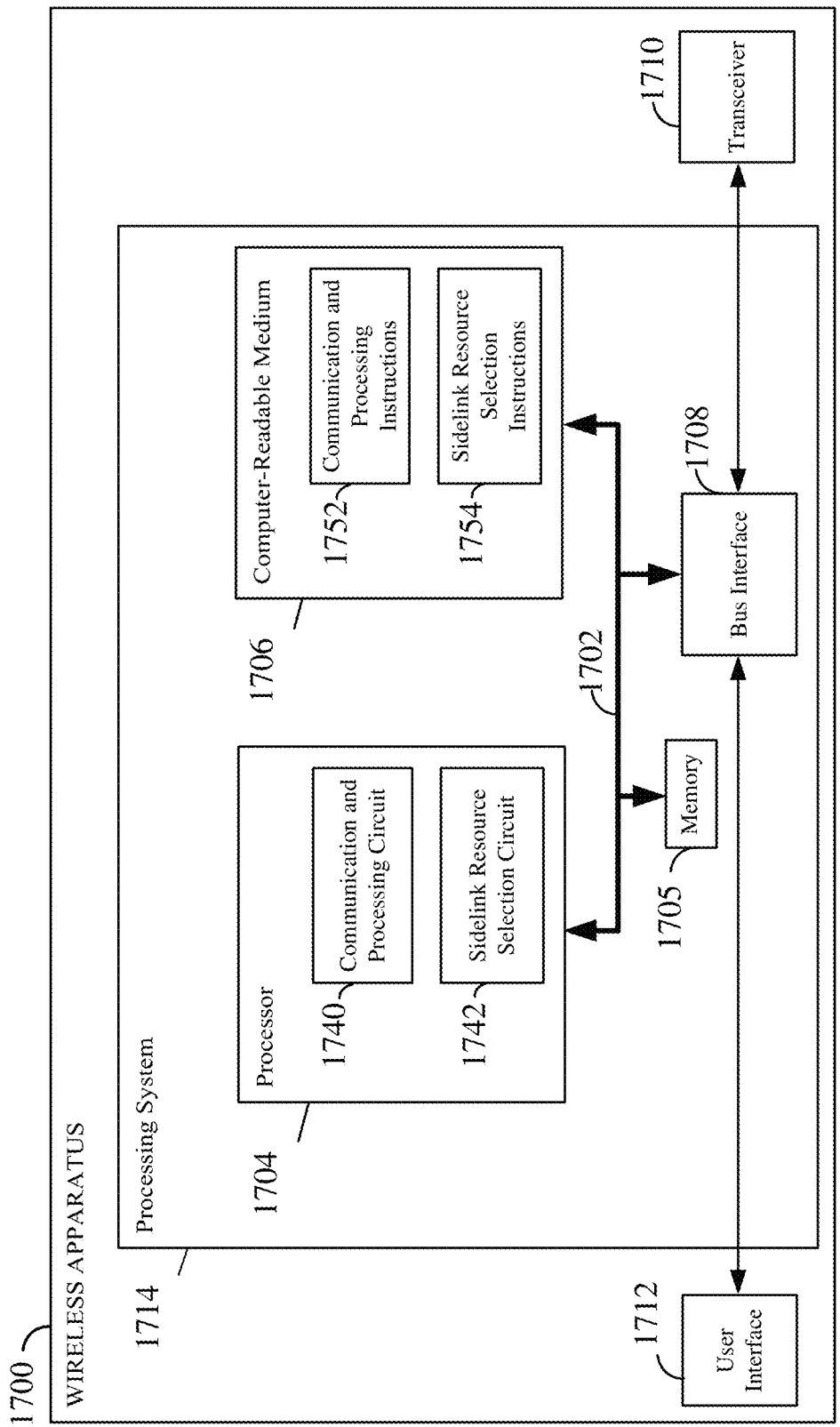
FIG. 17 is a block diagram illustrating an example of a hardware implementation for a wireless apparatus according to some aspects of the disclosure.

FIG. 17 is a block diagram illustrating an example of a hardware implementation for a wireless apparatus 1700 employing a processing system 1714. For example, the wireless apparatus 1700 may be a user equipment (UE) as illustrated in any one or more of FIGS. 1, 2, 3, 8, 9, and/or 10.

The wireless apparatus 1700 may be implemented with a processing system 1714 that includes one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless apparatus 1700 may be configured to perform any one or more of the functions described herein. That is, the processor 1704, as utilized in a wireless apparatus 1700, may be used to implement any one or more of the processes and procedures described and illustrated in FIGS. 8-10, 12-16, and 18.

The processor 1704 may in some instances be implemented via a baseband or modem chip and in other implementations, the processor 1704 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 communicatively couples together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further. A bus interface 1708 provides an interface between the bus 1702 and a transceiver 1710. The transceiver 1710 provides a communication interface or means for communicating with various other apparatus (e.g., UE or gNB) over a transmission medium. Depending upon the nature of the apparatus, a user interface 1712 (e.g., keypad, display, speaker, microphone, joystick) may also be provided. Of course, such a user interface 1712 is optional, and may be omitted in some examples, such as a base station.

The processor 1704 is responsible for managing the bus 1702 and general processing, including the execution of software stored on the computer-readable medium 1706. The software, when executed by the processor 1704, causes the processing system 1714 to perform the various functions described below for any particular apparatus. The computer-readable medium 1706 and the memory 1705 may also be used for storing data that is manipulated by the processor 1704 when executing software.

One or more processors 1704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1706. The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1704 may include circuitry configured for various functions, including, for example, sidelink communication using ComReSets. For example, the circuitry may be configured to implement one or more of the functions described in relation to FIGS. 8-10, 12-16, and 18.

In some aspects of the disclosure, the processor 1704 may include communication and processing circuitry 1740 configured for various functions, including for example communicating with a scheduling entity (e.g., gNB), scheduled entities (e.g., other UEs), or any other entity. In some examples, the communication and processing circuitry 1740 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1740 may include one or more transmit/receive chains. In addition, the communication and processing circuitry 1740 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). In addition, the communication and processing circuitry 1740 may be configured to transmit/receive and process sidelink communication (e.g., similar to sidelink or V2X traffic illustrated in FIG. 3) using one or more ComReSets. The communication and processing circuitry 1740 may further be configured to execute communication and processing software 1752 stored on the computer-readable medium 1706 to implement one or more functions described herein.

In some implementations where the communication involves receiving information, the communication and processing circuitry 1740 may obtain information from a component of the wireless communication device 1700 (e.g., from the transceiver 1710 that receives the information via radio frequency signaling or some other type of signaling suitable for the applicable communication medium), process (e.g., decode) the information, and output the processed information. For example, the communication and processing circuitry 1740 may output the information to another component of the processor 1704, to the memory 1705, or to the bus interface 1708. In some examples, the communication and processing circuitry 1740 may receive one or more of signals, messages, other information, or any combination thereof. In some examples, the communication and processing circuitry 1740 may receive information via one or more channels. In some examples, the communication and processing circuitry 1740 may include functionality for a means for receiving. In some examples, the communication and processing circuitry 1740 may include functionality for a means for processing, including a means for demodulating, a means for decoding, etc.

In some implementations where the communication involves sending (e.g., transmitting) information, the communication and processing circuitry 1740 may obtain information (e.g., from another component of the processor 1704, the memory 1705, or the bus interface 1708), process (e.g., modulate, encode, etc.) the information, and output the processed information. For example, the communication and processing circuitry 1740 may output the information to the transceiver 1710 (e.g., that transmits the information via radio frequency signaling or some other type of signaling suitable for the applicable communication medium). In some examples, the communication and processing circuitry 1740 may send one or more of signals, messages, other information, or any combination thereof. In some examples, the communication and processing circuitry 1740 may send information via one or more channels. In some examples, the communication and processing circuitry 1740 may include functionality for a means for sending (e.g., a means for transmitting). In some examples, the communication and processing circuitry 1740 may include functionality for a means for generating, including a means for modulating, a means for encoding, etc.

In some aspects of the disclosure, the processor 1704 may include sidelink resource selection circuitry 1742 configured to select and sense sidelink communication resources from a resource pool that contains frame-based periodic ComReSets dedicated for sidelink traffic or communication (e.g., V2X traffic). In some examples, the sidelink resource selection circuitry 1742 may include one or more hardware components that provide the physical structure that performs processes related to ComReSet management and selection for sidelink communication. For example, the sidelink resource selection circuitry 1742 may include hardware configured to negotiate with another sidelink device (e.g., UE) to select sidelink communication resources (e.g., one or more ComReSets) for sidelink communication between the devices. For example, the sidelink resource selection circuitry 1742 may include hardware configured to sense sidelink communication resources (e.g., one or more ComReSets) before using the resources for sidelink communication with another sidelink device. For example, the sidelink resource selection circuitry 1742 may include hardware configured to execute sidelink resource selection instructions 1754 stored in the computer-readable medium 1706 to implement one or more of the functions described herein.

Figure 18:
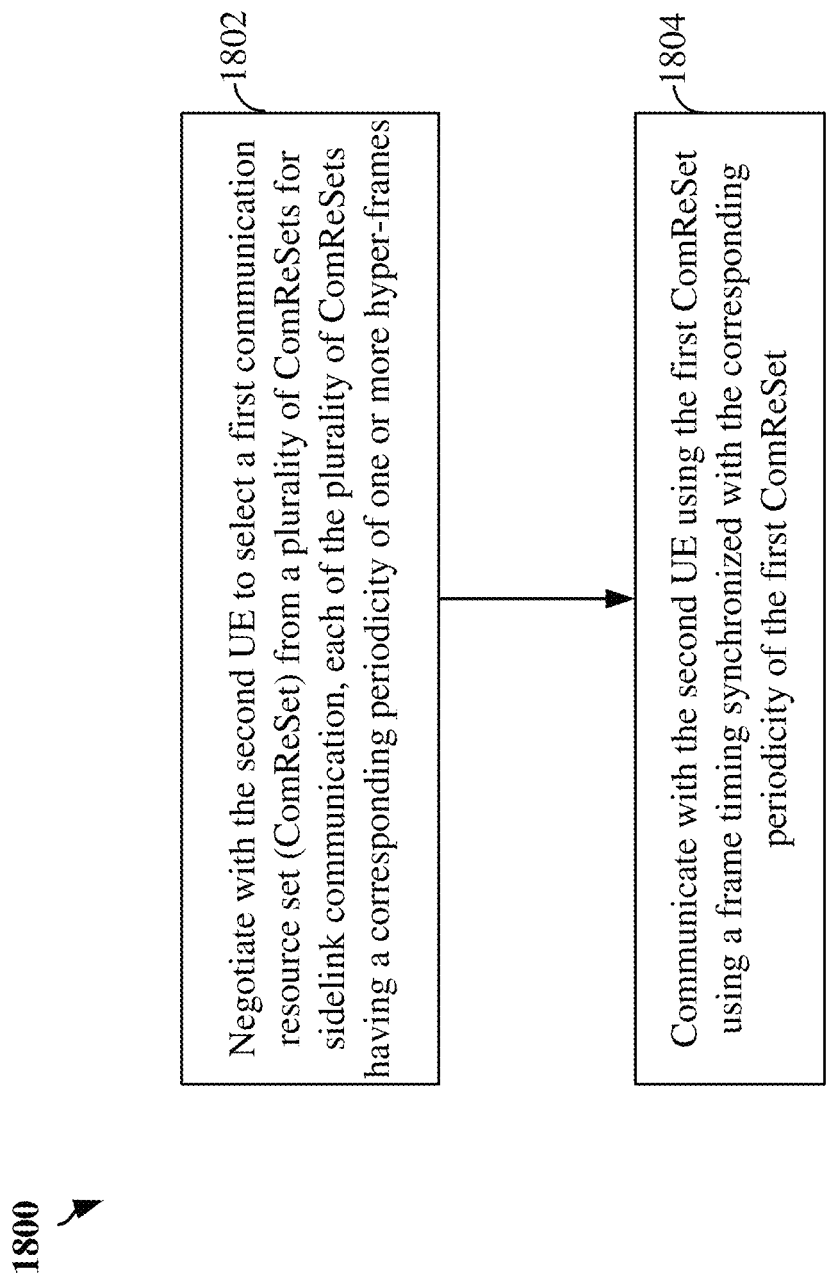
FIG. 18 is a flow chart illustrating an exemplary sidelink communication process in accordance with some aspects of the present disclosure.

FIG. 18 is a flow chart illustrating an exemplary sidelink communication process 1800 in accordance with some aspects of the present disclosure. As described below, some or all illustrated features may be omitted in a particular implementation within the scope of the present disclosure, and some illustrated features may not be required for all implementations. In some examples, the process 1800 may be carried out by the wireless apparatus 1700 illustrated in FIG. 17. In some examples, the process 1800 may be carried out by any suitable apparatus or means for carrying out the functions or algorithm described below. In some examples, the process 1800 may be carried out by any UE, scheduled entity, V2X device illustrated in FIGS. 1-3, and 8-10.

At block 1802, a first UE negotiates with a second UE to select a first communication resource set (ComReSet) from a plurality of ComReSets available or dedicated for sidelink communication. Each of the plurality of ComReSets has a corresponding periodicity of one or more hyper-frames. Each ComReSet can include one or more slots. In one example, the ComReSets may be any of the ComReSets described above in relation to FIGS. 5-7. The plurality of ComReSets may be in a communication resource pool (e.g., resource pool 500 of FIG. 5) dedicated to sidelink communication. The resource pool may include time-frequency resources that are reserved, dedicated, or available for sidelink communication. In one example, the sidelink resource selection circuitry 1742 may provide a means for negotiating with the second UE to select the ComReSet from the plurality of ComReSets.

At block 1804, the first UE communicates with the second UE using the first ComReSet using a frame timing synchronized with the corresponding periodicity of the first ComReSet. Each ComReSet has a time duration of a frame and a periodicity of a predetermined number of frames corresponding to one or more hyper-frames (see examples in FIGS. 5 and 6). In one aspect, the communication and processing circuitry 1740 may provide a means to communicate with the second UE using first ComReSet via the transceiver 1710.

In one aspect, the first UE may negotiate with the second UE using communication resources that is distinct from the sidelink resource pool. In one example, the first UE can use communication resources that are dedicated or reserved for sidelink discovery or negotiation. In another example, the first UE may negotiate with the second UE using a predetermined communication resource in the resource pool dedicated for sidelink resource negotiation. In another example, the first UE and second UE can randomly scan the resource pool until the first UE and the second UE can agree on the one or more ComReSets for the sidelink communication. In another example, the first UE can select one or more frame-based periodic ComReSets for the sidelink communication between the UEs, and notifies the second UE on the selected one or more ComReSets.

Figure 19:
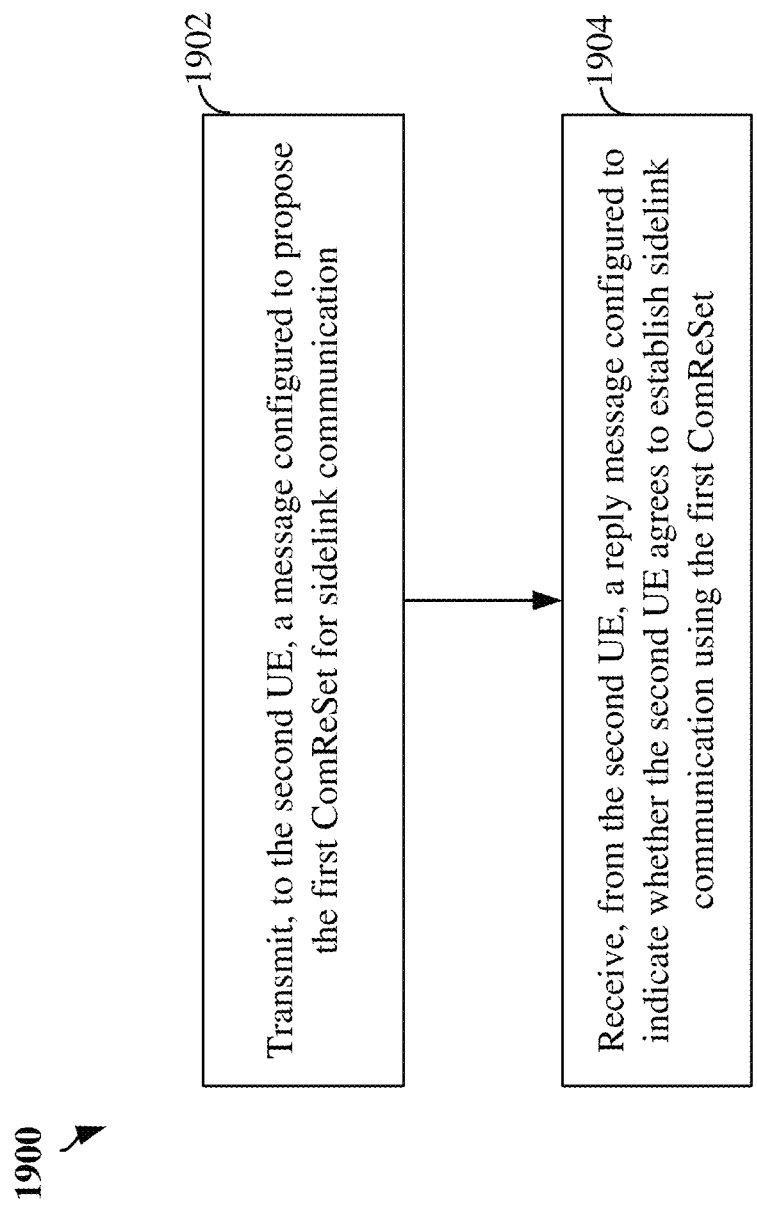
FIG. 19 is a flow chart illustrating an exemplary sidelink resource negotiation process in accordance with some aspects of the present disclosure.

FIG. 19 is a flow chart illustrating an exemplary sidelink resource negotiation process 1900 in accordance with some aspects of the present disclosure. As described below, some or all illustrated features may be omitted in a particular implementation within the scope of the present disclosure, and some illustrated features may not be required for all implementations. In some examples, the process 1900 may be carried out by the wireless apparatus 1700 illustrated in FIG. 17. In some examples, the process 1900 may be carried out by any suitable apparatus or means for carrying out the functions or algorithm described below. In some examples, the process 1900 may be carried out by any UE, scheduled entity, V2X device illustrated in FIGS. 1-3, and 8-10.

At block 1902, a first UE (e.g., V2X device) transmits, to a second UE, a message configured to propose a first ComReSet for sidelink communication with the second UE. In one example, the sidelink resource selection circuitry 1742 may provide a means for processing the message to propose the first ComReSet for sidelink communication with the second UE. In one aspect, the communication and processing circuitry 1740 may provide a means for transmitting the message (e.g., a sidelink message 1002 in FIG. 10) to the second UE. At block 1904, the first UE receives, from the second UE, a reply message configured to indicate whether the second UE agrees to establish sidelink communication using the first ComReSet. In one aspect, the communication and processing circuitry 1740 may provide a means for receiving the reply message (e.g., a sidelink message 1004 in FIG. 10) from the second UE.

Of course, in the above examples, the circuitry included in the processor 1704 is merely provided as an example, and other means for carrying out the described functions may be included within various aspects of the present disclosure, including but not limited to the instructions stored in the computer-readable storage medium 1706, or any other suitable apparatus or means described in any one of the FIGS. 1-3 and 8-10, and utilizing, for example, the processes and/or algorithms described herein in relation to FIGS. 8-16 and/or 19.

Figure 20:
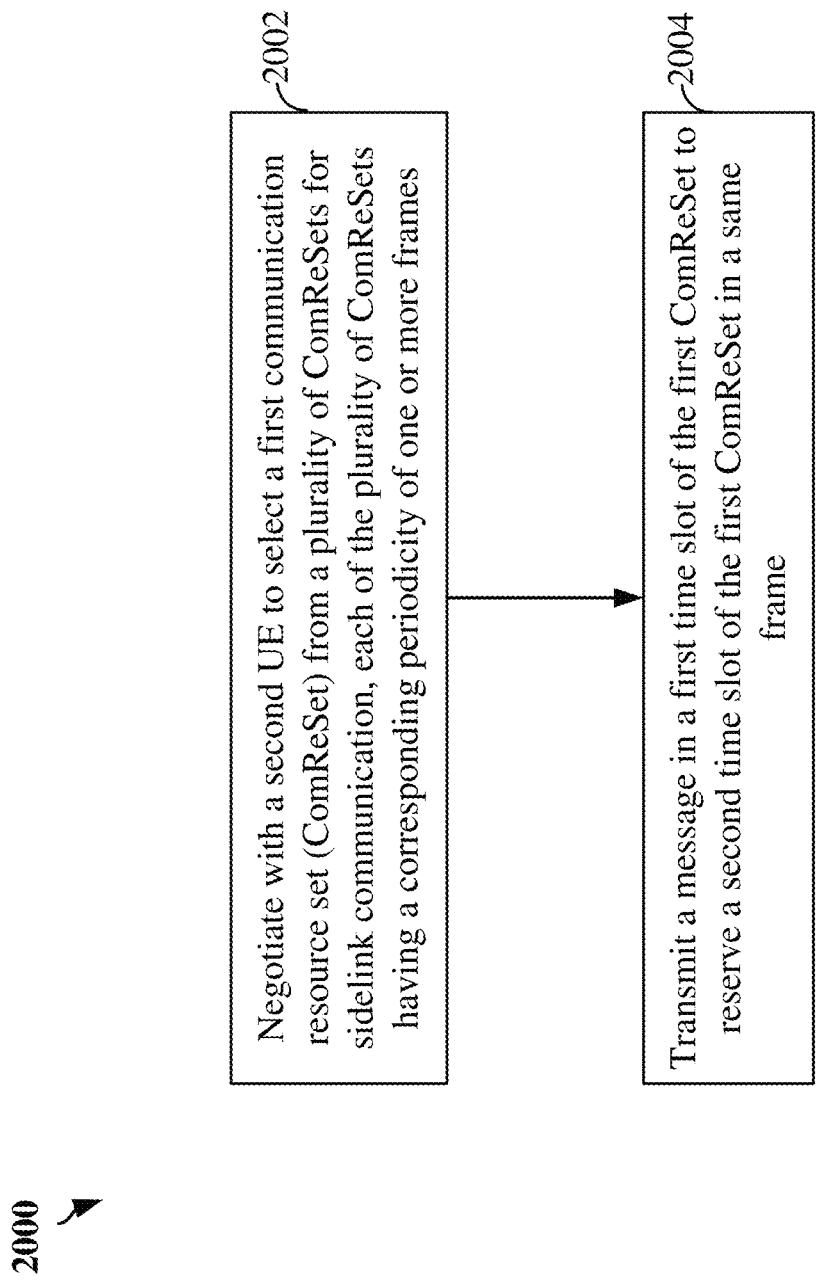
FIG. 20 is a flow chart illustrating another exemplary sidelink communication process in accordance with some aspects of the present disclosure.

FIG. 20 is a flow chart illustrating another exemplary sidelink communication process 2000 in accordance with some aspects of the present disclosure. As described below, some or all illustrated features may be omitted in a particular implementation within the scope of the present disclosure, and some illustrated features may not be required for all implementations. In some examples, the process 2000 may be carried out by the wireless apparatus 1700 illustrated in FIG. 17. In some examples, the process 2000 may be carried out by any suitable apparatus or means for carrying out the functions or algorithm described below. In some examples, the process 2000 may be carried out by any UE, scheduled entity, V2X device illustrated in FIGS. 1-3, and 8-10.

At block 2002, a first UE negotiates with a second UE to select a first ComReSet from a plurality of ComReSets available or dedicated for sidelink communication. Each of the plurality of ComReSets has a corresponding periodicity of one or more hyper-frames. Each ComReSet can include one or more slots. In one example, the ComReSets may be any of the ComReSets described above in relation to FIGS. 5-7. The plurality of ComReSets may be in a communication resource pool (e.g., resource pool 500 of FIG. 5) available for or dedicated to sidelink communication. The resource pool may include time-frequency resources that are reserved, dedicated, or available for sidelink communication. In one example, the sidelink resource selection circuitry 1742 may provide a means for negotiating with the second UE to select the ComReSet from the plurality of ComReSets.

At block 2004, the first UE can transmit a message in a first time slot of the first ComReSet to reserve a second time slot of the first ComReSet in a same frame. For example, the first UE can reserve resources 1202 in a first slot and two future slots as described above in FIG. 12. In one aspect, the communication and processing circuitry 1740 may provide a means to transmit the a message in a first time slot of the first ComReSet to reserve a second time slot of the first ComReSet in a same frame.

In one aspect, the first UE may negotiate with the second UE using communication resources that is distinct from the sidelink resource pool. In one example, the first UE can use communication resources that are dedicated or reserved for sidelink discovery or negotiation. In another example, the first UE may negotiate with the second UE using a predetermined communication resource in the resource pool available or dedicated for sidelink resource negotiation. In another example, the first UE and second UE can randomly scan the resource pool until the first UE and the second UE can agree on the one or more ComReSets for the sidelink communication. In another example, the first UE can select one or more frame-based periodic ComReSets for the sidelink communication between the UEs, and notifies the second UE on the selected one or more ComReSets.

Figure 21:
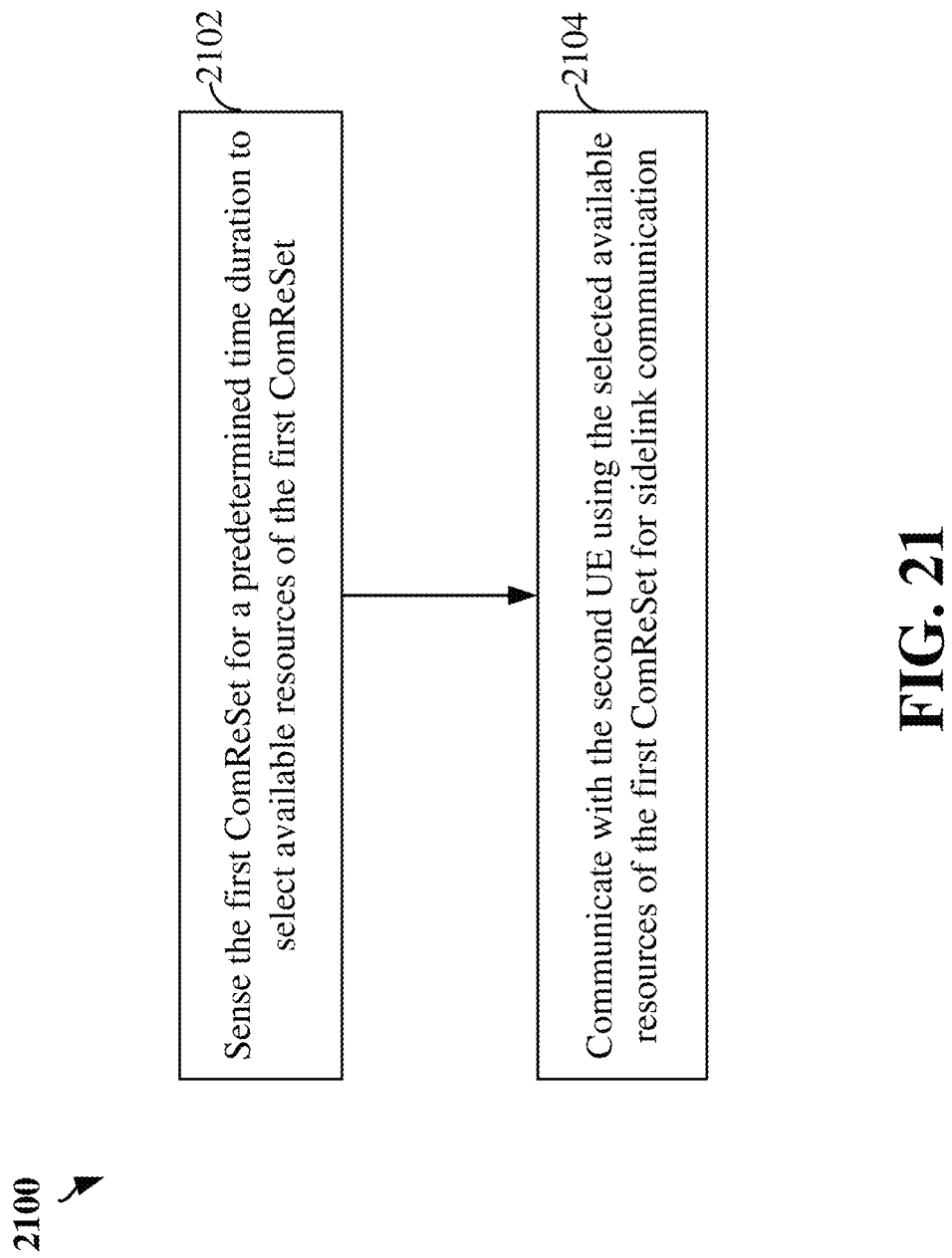
FIG. 21 is a flow chart illustrating an exemplary sidelink communication process using sensing in accordance with some aspects of the present disclosure

FIG. 21 is a flow chart illustrating an exemplary sidelink communication process 2100 using sensing in accordance with some aspects of the present disclosure. As described below, some or all illustrated features may be omitted in a particular implementation within the scope of the present disclosure, and some illustrated features may not be required for all implementations. In some examples, the process 2100 may be carried out by the wireless apparatus 1700 illustrated in FIG. 17. In some examples, the process 2100 may be carried out by any suitable apparatus or means for carrying out the functions or algorithm described below. In some examples, the process 2100 may be carried out by any UE, scheduled entity, V2X device illustrated in FIGS. 1-3, and 8-10.

At block 2102, a first UE can sense the first ComReSet for a predetermined time duration to select available resources of the first ComReSet. Before using a ComReSet for sidelink communication, the UE senses the spectrum of the first ComReSet to determine that the resources, if any, of the first ComReSet that are available or not used by other devices. To sense the ComReSet spectrum, the UE can listen, detect, or sense the subchannels or subcarriers at the time slots corresponding to the selected ComReSet. In one aspect, the communication and processing circuitry 1740 and/or transceiver 1710 may provide a means to sense the first ComReSet. The sidelink resource selection circuit 1742 can provide a means to select the available resources for sidelink communication.

At block 2104, the first UE can communicate with a second UE using the selected available resources of the first ComReSet for sidelink communication. In one aspect, the communication and processing circuitry 1740 may provide a means to communicate with the second UE via the transceiver 1710 using the selected resources of the first ComReSet.

In one configuration, the apparatus 1700 for wireless communication includes means for sidelink communication using ComReSets as described above. In one aspect, the aforementioned means may be the processor 1704 shown in FIG. 17 configured to perform the functions recited by the aforementioned means. In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable storage medium 1706, or any other suitable apparatus or means described in any one of the FIGS. 1-3 and 8-10 and utilizing, for example, the processes and/or algorithms described herein in relation to FIGS. 8-16 and/or 18-21.

In a first aspect, a first user equipment (UE) for wireless communication is provided. The first UE comprises: a transceiver configured to communicate with a second UE; a memory; and a processor operatively coupled to the memory and the transceiver. The processor and the memory are configured to: negotiate with the second UE to select a first communication resource set (ComReSet) from a plurality of ComReSets for sidelink communication, each of the plurality of ComReSets having a corresponding periodicity of one or more hyper-frames; and communicate with the second UE using the first ComReSet using a frame timing synchronized with the corresponding periodicity of the first ComReSet.

In a second aspect, alone or in combination with the first aspect, the plurality of ComReSets comprise the first ComReSet and a second ComReSet, and a first periodicity of the first ComReSet is different from a second periodicity of the second ComReSet.

In a third aspect, alone or in combination with the second aspect, the first ComReSet repeats according to the first periodicity, and the second ComReSet repeats according to the second periodicity that is different in duration from the first periodicity in terms of a number of hyper-frames.

In a fourth aspect, alone or in combination with any of the first to third aspects, wherein the processor and the memory are further configured to transmit, to the second UE, information comprising respective periodicities of the plurality of ComReSets.

In a fifth aspect, alone or in combination with any of the first to third aspects, wherein the processor and the memory are further configured to receive, from the second UE, information comprising respective periodicities of the plurality of ComReSets.

In a sixth aspect, alone or in combination with any of the first to fifth aspects, wherein a hyper-frame of the one or more hyper-frames comprises a plurality of frames, each frame corresponding to a different one of the plurality of ComReSets.

In a seventh aspect, alone or in combination with any of the first to sixth aspects, wherein the processor and the memory are further configured to negotiate with the second UE by: transmitting, to the second UE, a message indicating the first ComReSet for sidelink communication; and receiving, from the second UE, a reply message indicating acceptance or non-acceptance of the first ComReSet for sidelink communication with the first UE.

In an eighth aspect, alone or in combination with the seventh aspect, wherein the reply message further comprises a request to utilize a second ComReSet for sidelink communication.

In a ninth aspect, a method of wireless communication at a first UE is provided. The method comprises: negotiating with a second UE to select a first communication resource set (ComReSet) from a plurality of ComReSets for sidelink communication, each of the plurality of ComReSets having a corresponding periodicity of one or more hyper-frames; and communicating with the second UE using the first ComReSet using a frame timing synchronized with the corresponding periodicity of the first ComReSet.

In a tenth aspect, alone or in combination with the ninth aspect, the plurality of ComReSets comprise the first ComReSet and a second ComReSet, and a first periodicity of the first ComReSet is different from a second periodicity of the second ComReSet.

In an eleventh aspect, alone or in combination with the tenth aspect, the first ComReSet repeats according to the first periodicity, and the second ComReSet repeats according to the second periodicity that is different in duration from the first periodicity in terms of a number of hyper-frames.

In a twelfth aspect, alone or in combination with any of the ninth to eleventh aspects, the method further comprises transmitting, to the second UE, information comprising respective periodicities of the plurality of ComReSets.

In a thirteenth aspect, alone or in combination with any of the ninth to eleventh aspects, the method further comprises receiving, from the second UE, information comprising respective periodicities of the plurality of ComReSets.

In a fourteenth aspect, alone or in combination with any of the ninth to thirteenth aspects, wherein a hyper-frame of the one or more hyper-frames comprises a plurality of frames, each frame corresponding to a different one of the plurality of ComReSets.

In a fifteenth aspect, alone or in combination with any of the ninth to fourteenth aspects, wherein the negotiating with the second UE comprises: transmitting, to the second UE, a message indicating the first ComReSet for sidelink communication; and receiving, from the second UE, a reply message indicating acceptance or non-acceptance of the first ComReSet for sidelink communication with the first UE.

In a sixteenth aspect, alone or in combination with the fifteenth aspect, wherein the reply message further comprises a request to utilize a second ComReSet for sidelink communication.

In a seventeenth aspect, a first user equipment (UE) for wireless communication is provided. The first UE comprises: a transceiver configured to communicate with a second UE; a memory; and a processor operatively coupled to the memory and the transceiver. The processor and the memory are configured to: negotiate with the second UE to select a first communication resource set (ComReSet) from a plurality of ComReSets for sidelink communication, each of the plurality of ComReSets having a corresponding periodicity of one or more frames; and transmit a message in a first time slot of the first ComReSet to reserve a second time slot of the first ComReSet in a same frame.

In an eighteenth aspect, alone or in combination with the seventeenth aspect, wherein the processor and the memory are further configured to: transmit a message in the first time slot of the first ComReSet to reserve a third time slot of the first ComReSet in a different frame.

In a nineteenth aspect, alone or in combination with any of the seventeenth to eighteenth aspects, wherein the processor and the memory are further configured to: sense the first ComReSet for a predetermined time duration to select available resources of the first ComReSet; and communicate with the second UE using the selected available resources of the first ComReSet for sidelink communication.

In a twentieth aspect, alone or in combination with the nineteenth aspect, wherein the processor and the memory are further configured to: receive control information from a scheduling entity, the control information configuring the predetermined time duration.

In a twenty-first aspect, alone or in combination with any of the seventeenth to eighteenth aspects, wherein the processor and the memory are further configured to: sense the first ComReSet for a predetermined time duration to select available resources of the first ComReSet; and negotiate with the second UE to select the first ComReSet for sidelink communication in consideration of the sensing of the first ComReSet.

In a twenty-second aspect, alone or in combination with any of the seventeenth to twenty-first aspects, wherein: the plurality of ComReSets comprise the first ComReSet and a second ComReSet; and a first periodicity of the first ComReSet is different from a second periodicity of the second ComReSet.

In a twenty-third aspect, alone or in combination with any of the seventeenth to twenty-second aspects, wherein the processor and the memory are further configured to negotiate with the second UE by: transmitting, to the second UE, a message indicating the first ComReSet for sidelink communication; and receiving, from the second UE, a reply message indicating acceptance or non-acceptance of the first ComReSet for sidelink communication with the first UE.

In a twenty-fourth aspect, a method of wireless communication at a first user equipment (UE) is provided. The method comprises: negotiating with a second UE to select a first communication resource set (ComReSet) from a plurality of ComReSets for sidelink communication, each of the plurality of ComReSets having a corresponding periodicity of one or more frames; and transmitting a message in a first time slot of the first ComReSet to reserve a second time slot of the first ComReSet in a same frame.

In a twenty-fifth aspect, alone or in combination with the twenty-fourth aspect, the method further comprises: transmitting a message in the first time slot of the first ComReSet to reserve a third time slot of the first ComReSet in a different frame.

In a twenty-sixth aspect, alone or in combination with any of the twenty-fourth to twenty-fifth aspects, the method further comprises: sensing the first ComReSet for a predetermined time duration to select available resources of the first ComReSet; and communicating with the second UE using the selected available resources of the first ComReSet for sidelink communication.

In a twenty-seventh aspect, alone or in combination with the twenty-sixth aspect, the method further comprises: receiving control information from a scheduling entity, the control information configuring the predetermined time duration.

In a twenty-eighth aspect, alone or in combination with any of the twenty-fourth to twenty-fifth aspects, the method further comprises: sensing the first ComReSet for a predetermined time duration to select available resources of the first ComReSet; and negotiating with the second UE to select the first ComReSet for sidelink communication in consideration of the sensing of the first ComReSet.

In a twenty-ninth aspect, alone or in combination with any of the twenty-fourth to twenty-eighth aspects, wherein: the plurality of ComReSets comprise the first ComReSet and a second ComReSet; and a first periodicity of the first ComReSet is different from a second periodicity of the second ComReSet.

In a thirtieth aspect, alone or in combination with any of the twenty-fourth to twenty-ninth aspects, wherein the negotiating with the second UE comprises: transmitting, to the second UE, a message indicating the first ComReSet for sidelink communication; and receiving, from the second UE, a reply message indicating acceptance or non-acceptance of the first ComReSet for sidelink communication with the first UE.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-21 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A first user equipment (UE) for wireless communication comprising:
   a transceiver configured to communicate with a second UE:
   a memory; and
   a processor operatively coupled to the memory and the transceiver,
   wherein the processor and the memory are configured to:
      negotiate with the second UE to select a first communication resource set (ComReSet) from a plurality of ComReSets for sidelink communication, each of the plurality of ComReSets having a corresponding periodicity of one or more hyper-frames; and
   communicate with the second UE using the first ComReSet using a frame timing synchronized with the corresponding periodicity of the first ComReSet;
   wherein the plurality of ComReSets comprise the first ComReSet and a second ComReSet;
   a first periodicity of the first ComReSet is different from a second periodicity of the second ComReSet;
   the first ComReSet repeats according to the first periodicity; and
   the second ComReSet repeats according to the second periodicity that is different in duration from the first periodicity in terms of a number of hyper-frames.

2. The first UE of claim 1, wherein the processor and the memory are further configured to:
   transmit, to the second UE, information comprising respective periodicities of the plurality of ComReSets.

3. The first UE of claim 1, wherein the processor and the memory are further configured to:
   receive, from the second UE, information comprising respective periodicities of the plurality of ComReSets.

4. The first UE of claim 1, wherein a hyper-frame of the one or more hyper-frames comprises a plurality of frames, each frame corresponding to a different one of the plurality of ComReSets.

5. The first UE of claim 1, wherein the processor and the memory are further configured to negotiate with the second UE by:
 transmitting, to the second UE, a message indicating the first ComReSet for sidelink communication; and
 receiving, from the second UE, a reply message indicating acceptance or non-acceptance of the first ComReSet for sidelink communication with the first UE.

6. The first UE of claim 5, wherein the reply message further comprises a request to utilize a second ComReSet for sidelink communication.

7. A method of wireless communication at a first user equipment (UE), the method comprising:
 negotiating with a second UE to select a first communication resource set (ComReSet) from a plurality of ComReSets for sidelink communication, each of the plurality of ComReSets having a corresponding periodicity of one or more hyper-frames; and
 communicating with the second UE using the first ComReSet using a frame timing synchronized with the corresponding periodicity of the first ComReSet;
 wherein the plurality of ComReSets comprise the first ComReSet and a second ComReSet;
 a first periodicity of the first ComReSet is different from a second periodicity of the second ComReSet;
 the first ComReSet repeats according to the first periodicity; and
 the second ComReSet repeats according to the second periodicity that is different in duration from the first periodicity in terms of a number of hyper-frames.

8. The method of claim 7, further comprising:
 transmitting, to the second UE, information comprising respective periodicities of the plurality of ComReSets.

9. The method of claim 7, further comprising:
 receiving, from the second UE, information comprising respective periodicities of the plurality of ComReSets.

10. The method of claim 7, wherein a hyper-frame of the one or more hyper-frames comprises a plurality of frames, each frame corresponding to a different one of the plurality of ComReSets.

11. The method of claim 7, wherein the negotiating with the second UE comprises:
 transmitting, to the second UE, a message indicating the first ComReSet for sidelink communication; and
 receiving, from the second UE, a reply message indicating acceptance or non-acceptance of the first ComReSet for sidelink communication with the first UE.

12. The method of claim 11, wherein the reply message further comprises a request to utilize a second ComReSet for sidelink communication.

13. A first user equipment (UE) for wireless communication comprising:
 a transceiver configured to communicate with a second UE:
 a memory; and
 a processor operatively coupled to the memory and the transceiver,
 wherein the processor and the memory are configured to:
 negotiate with the second UE to select a first communication resource set (ComReSet) from a plurality of ComReSets for sidelink communication, each of the plurality of ComReSets having a corresponding periodicity of one or more frames; and transmit a message in a first time slot of the first ComReSet to reserve a second time slot of the first ComReSet in a same frame;
 transmit a message in the first time slot of the first ComReSet to reserve a third time slot of the first ComReSet in a different frame;
 sense the first ComReSet for a predetermined time duration to select available resources of the first ComReSet;
 communicate with the second UE using the selected available resources of the first ComReSet for sidelink communication; and
 receive control information from a scheduling entity, the control information configuring the predetermined time duration.

14. The first UE of claim 13, wherein the processor and the memory are further configured to:
 sense the first ComReSet for a predetermined time duration to select available resources of the first ComReSet; and
 negotiate with the second UE to select the first ComReSet for sidelink communication in consideration of the sensing of the first ComReSet.

15. The first UE of claim 13, wherein:
 the plurality of ComReSets comprise the first ComReSet and a second ComReSet; and
 a first periodicity of the first ComReSet is different from a second periodicity of the second ComReSet.

16. The first UE of claim 13, wherein the processor and the memory are further configured to negotiate with the second UE by:
 transmitting, to the second UE, a message indicating the first ComReSet for sidelink communication; and
 receiving, from the second UE, a reply message indicating acceptance or non-acceptance of the first ComReSet for sidelink communication with the first UE.

17. A method of wireless communication at a first user equipment (UE), the method comprising:
 negotiating with a second UE to select a first communication resource set (ComReSet) from a plurality of ComReSets for sidelink communication, each of the plurality of ComReSets having a corresponding periodicity of one or more frames;
 transmitting a message in a first time slot of the first ComReSet to reserve a second time slot of the first ComReSet in a same frame;
 transmitting a message in the first time slot of the first ComReSet to reserve a third time slot of the first ComReSet in a different frame;
 sensing the first ComReSet for a predetermined time duration to select available resources of the first ComReSet; and
 communicating with the second UE using the selected available resources of the first ComReSet for sidelink communication;
 receiving control information from a scheduling entity, the control information configuring the predetermined time duration.

18. The method of claim 17, further comprising:
 sensing the first ComReSet for a predetermined time duration to select available resources of the first ComReSet; and
 negotiating with the second UE to select the first ComReSet for sidelink communication in consideration of the sensing of the first ComReSet.

19. The method of claim 17, wherein:
 the plurality of ComReSets comprise the first ComReSet and a second ComReSet; and a first periodicity of the first ComReSet is different from a second periodicity of the second ComReSet.

20. The method of claim 17, wherein the negotiating with the second UE comprises:

transmitting, to the second UE, a message indicating the first ComReSet for sidelink communication; and
receiving, from the second UE, a reply message indicating acceptance or non-acceptance of the first ComReSet for sidelink communication with the first UE.

* * * * *